(12) United States Patent
Momma et al.

(10) Patent No.: US 10,230,093 B2
(45) Date of Patent: Mar. 12, 2019

(54) METHOD FOR MANUFACTURING STORAGE BATTERY ELECTRODE

(71) Applicant: SEMICONDUCTOR ENERGY LABORATORY CO., LTD., Atsugi-shi, Kanagawa-ken (JP)

(72) Inventors: Yohei Momma, Kanagawa (JP); Takahiro Kawakami, Kanagawa (JP); Teruaki Ochiai, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 182 days.

(21) Appl. No.: 15/273,131

(22) Filed: Sep. 22, 2016

(65) Prior Publication Data

US 2017/0092929 A1    Mar. 30, 2017

(30) Foreign Application Priority Data

Sep. 25, 2015  (JP) ................................ 2015-187733

(51) Int. Cl.
| | |
|---|---|
| *H01M 4/04* | (2006.01) |
| *H01M 4/62* | (2006.01) |
| *H01M 4/505* | (2010.01) |
| *H01M 10/052* | (2010.01) |

(52) U.S. Cl.
CPC ............. *H01M 4/04* (2013.01); *H01M 4/621* (2013.01); *H01M 4/623* (2013.01); *H01M 4/625* (2013.01); *H01M 4/505* (2013.01); *H01M 10/052* (2013.01); *H01M 2220/30* (2013.01); *Y02E 60/122* (2013.01)

(58) Field of Classification Search
CPC .......... H01M 4/04; H01M 4/36; H01M 4/131; H01M 4/133; H01M 4/0525
See application file for complete search history.

(56) References Cited

U.S. PATENT DOCUMENTS

| | | |
|---|---|---|
| 6,200,703 B1 | 3/2001 | Kashio et al. |
| 2002/0102459 A1 | 8/2002 | Hosoya et al. |
| 2010/0266882 A1 | 10/2010 | Igarashi et al. |
| 2013/0230709 A1 | 9/2013 | Zhou et al. |
| 2013/0266859 A1 | 10/2013 | Todoriki et al. |
| 2013/0337320 A1 | 12/2013 | Yukawa |
| 2014/0315091 A1 | 10/2014 | Yamazaki et al. |
| 2014/0332715 A1 | 11/2014 | Kawakami et al. |
| 2015/0014581 A1 | 1/2015 | Kawakami et al. |
| 2015/0014605 A1 | 1/2015 | Kawakami et al. |
| 2015/0099179 A1 | 4/2015 | Ikenuma et al. |
| 2015/0333319 A1 | 11/2015 | Kawamura et al. |
| 2015/0333320 A1 | 11/2015 | Tamaki et al. |

FOREIGN PATENT DOCUMENTS

| | | |
|---|---|---|
| JP | 2002-110162 A | 4/2002 |
| JP | 2014-007141 A | 1/2014 |
| WO | WO-2011/141486 | 11/2011 |
| WO | WO-2016/110771 | 7/2016 |

*Primary Examiner* — Haidung D Nguyen
(74) *Attorney, Agent, or Firm* — Nixon Peabody LLP; Jeffrey L. Costellia

(57) ABSTRACT

A storage battery electrode with high capacity is stably manufactured with the use of a strongly basic active material. The basicity of a mixture of a strongly basic active material and graphene oxide, the mixture subjected to heat treatment, or the mixture subjected to reduction by addition of a reducing agent is measured. Only in the case where the measured basicity falls within a predetermined range, a binder such as polyvinylidene fluoride (PVdF) is mixed to form a slurry. Thus, gelation of the binder can be prevented.

19 Claims, 10 Drawing Sheets

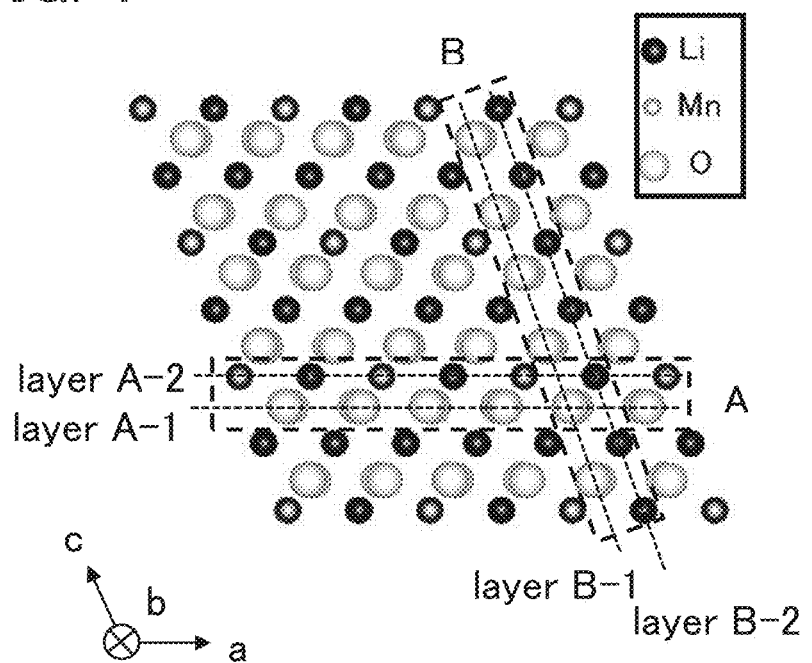

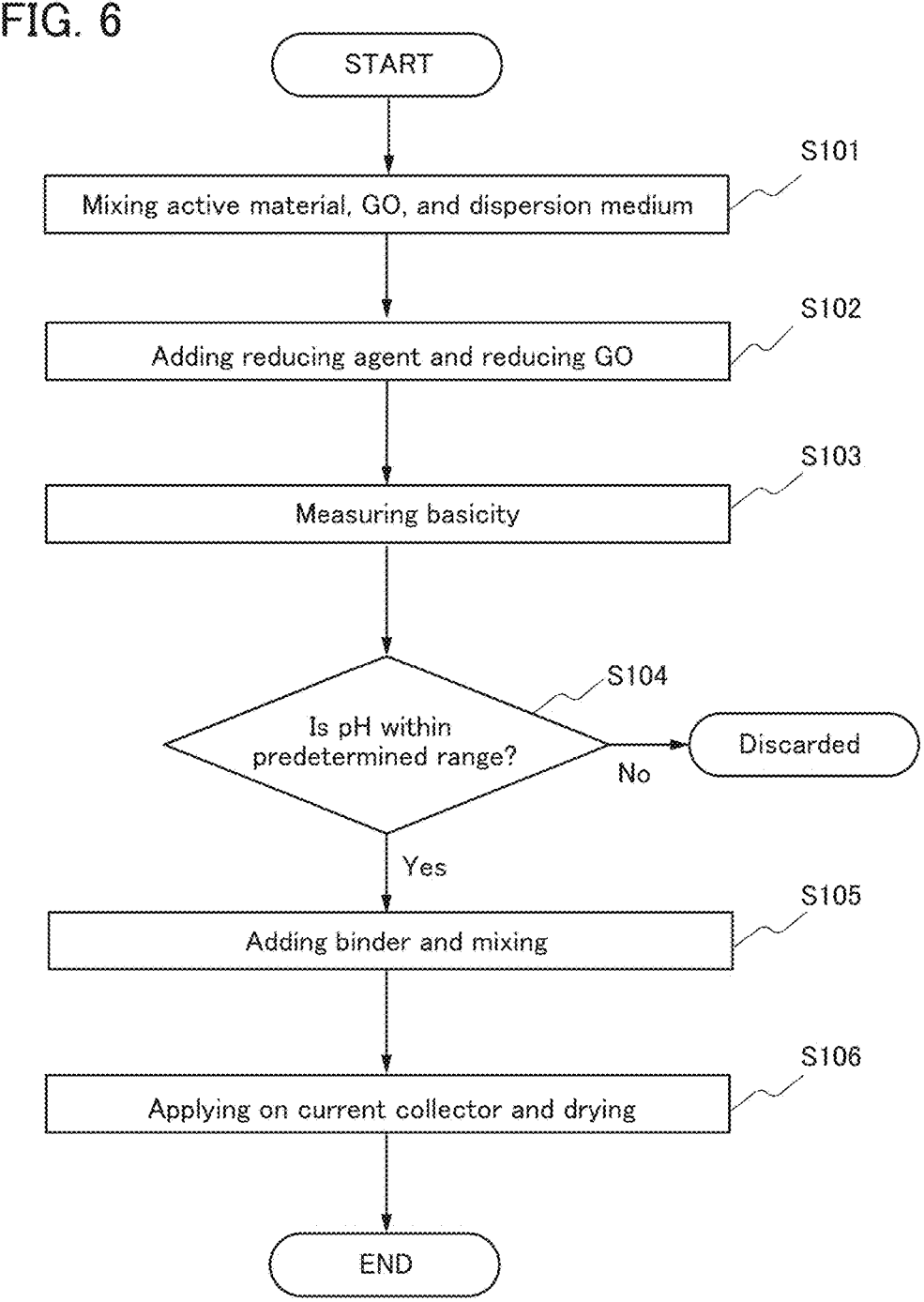

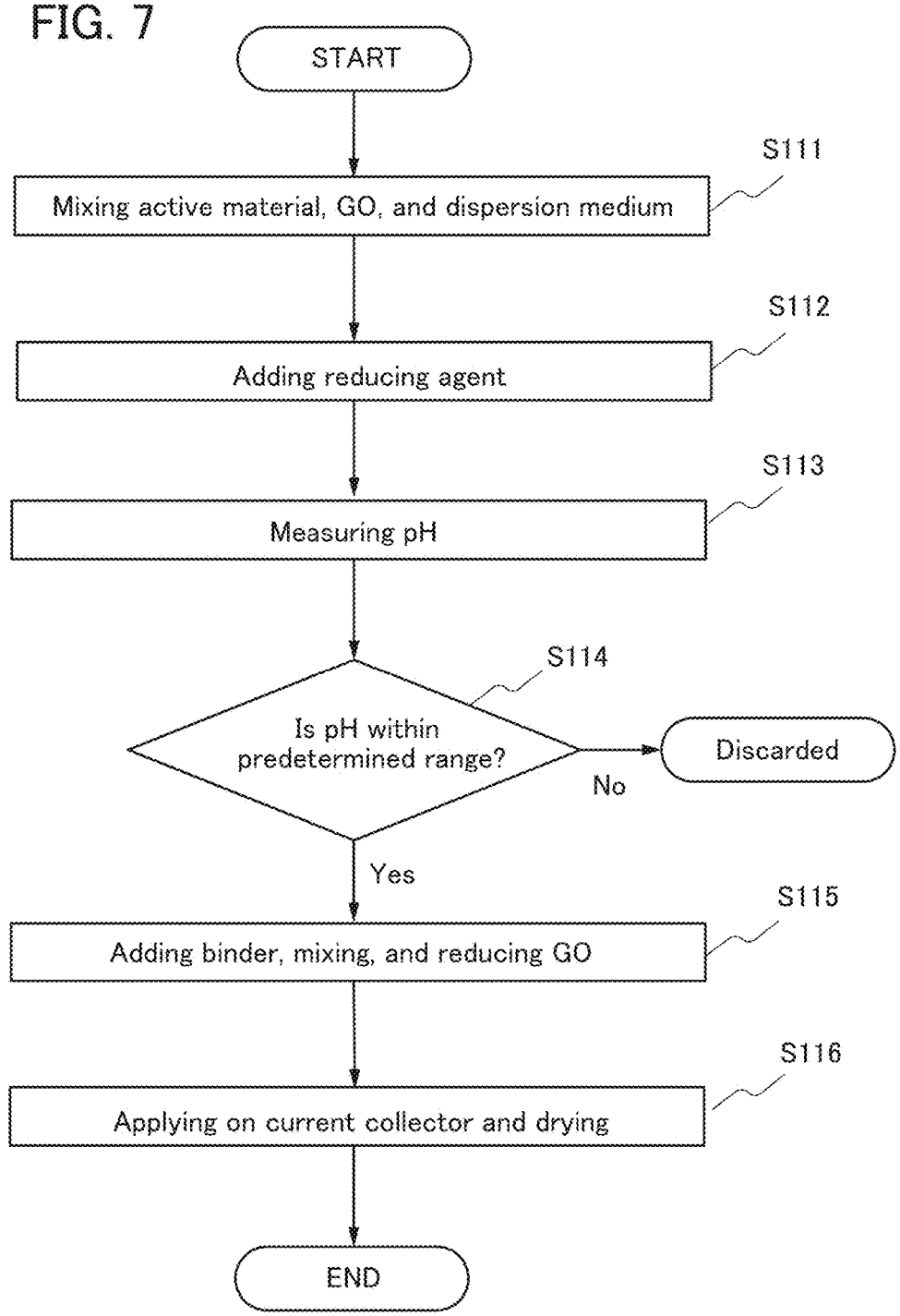

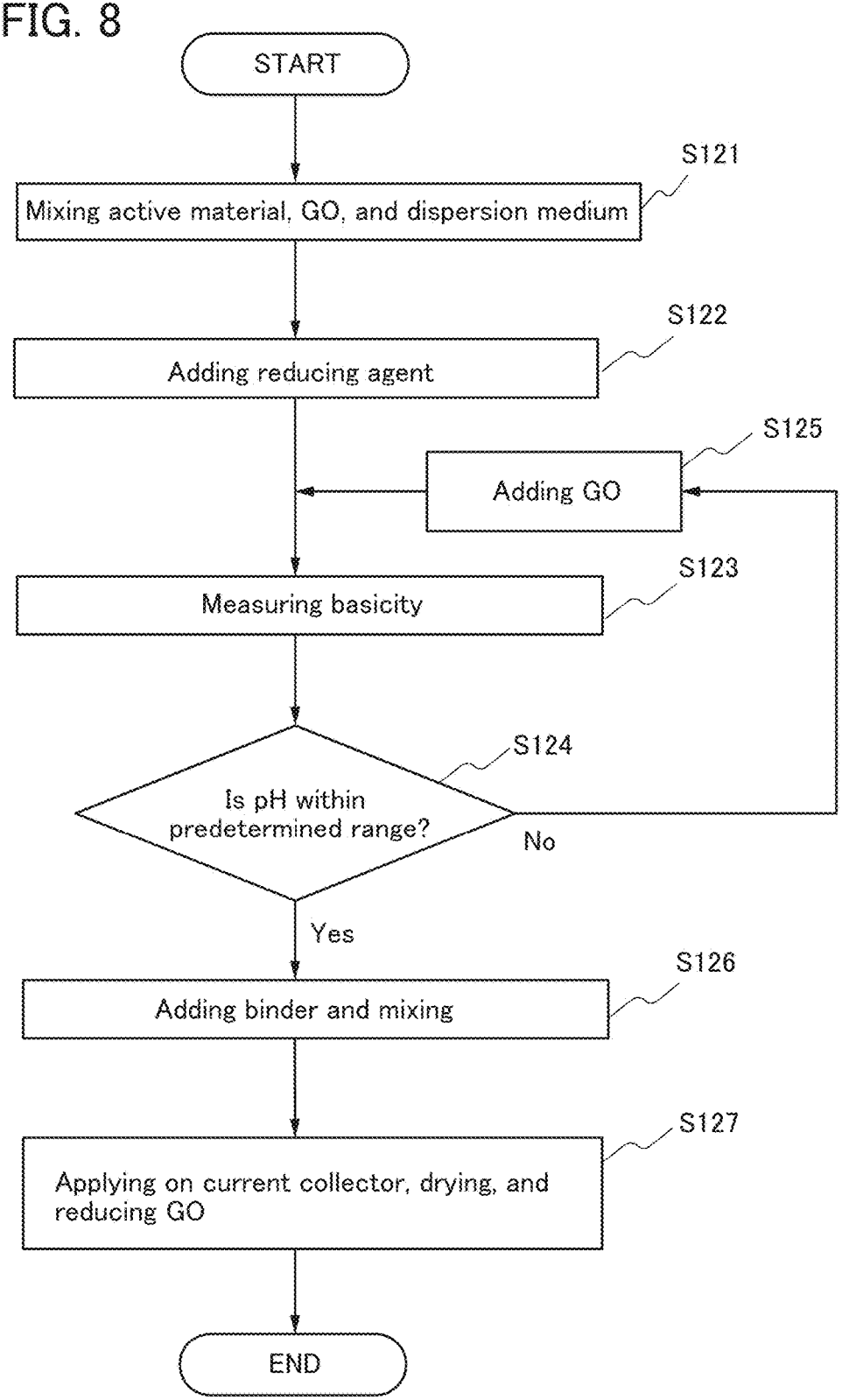

METHOD FOR MANUFACTURING STORAGE BATTERY ELECTRODE

BACKGROUND OF THE INVENTION

1. Field of the Invention

One embodiment of the present invention relates to a storage battery electrode, a manufacturing method thereof, a storage battery, and an electronic device.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specific examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

With the recent rapid spread of portable electronic devices such as mobile phones, smartphones, electronic book (e-book) readers, and portable game machines, secondary batteries for drive power sources have been increasingly required to be smaller and to have higher capacity. Nonaqueous secondary batteries typified by lithium-ion secondary batteries, which have advantages such as high energy density and high capacity, have been widely used as secondary batteries for portable electronic devices.

A lithium-ion secondary battery, which is one of nonaqueous secondary batteries and widely used due to its high energy density, includes a positive electrode including an active material such as lithium cobalt oxide ($LiCoO_2$) or lithium iron phosphate ($LiFePO_4$), a negative electrode including an active material such as graphite capable of reception and release of lithium ions, a nonaqueous electrolytic solution in which an electrolyte formed of a lithium salt such as $LiBF_4$ or $LiPF_6$ is dissolved in an organic solvent such as ethylene carbonate or diethyl carbonate, and the like. The lithium-ion secondary battery is charged and discharged in such a way that lithium ions in the secondary battery move between the positive electrode and the negative electrode through the nonaqueous electrolytic solution and are inserted into or extracted from the active materials of the positive electrode and the negative electrode.

A binder is mixed into the positive electrode or the negative electrode in order that active material particles can be bound to each other or an active material layer and a current collector can be bound. Since the binder is generally an organic high molecular compound such as polyvinylidene fluoride (PVdF) which has an insulating property, the electric conductivity of the binder is extremely low. Furthermore, the binder has no charge storage capability. Thus, as the ratio of the amount of the binder to the amount of the active material is increased, the output voltage of the secondary battery is decreased due to high inner resistance, and in addition, the proportion of the amount of the active material in the electrode is relatively decreased. As a result, discharge capacity of the secondary battery is decreased.

Hence, by mixture of a conductive additive such as acetylene black (AB) or graphite particles, the electric conductivity between active material particles or between an active material layer and a current collector can be improved. Thus, an active material layer with high electrical conductivity can be provided (see Patent Document 1).

An electrode including graphene as a conductive additive has been developed. Patent Documents 2 and 3 each disclose an electrode manufacturing method in which graphene oxide (GO) which is an oxidized derivative of graphene, an active material, and a binder are mixed and then the GO is reduced. By this manufacturing method, an active material layer having high electrical conductivity only with a small amount of the conductive additive can be provided.

REFERENCE

Patent Documents

[Patent Document 1] Japanese Published Patent Application No. 2002-110162
[Patent Document 2] Japanese Published Patent Application No. 2014-007141
[Patent Document 3] United States Published Patent Application No. 2015/0099179

SUMMARY OF THE INVENTION

To improve the performance of a storage battery, a method for manufacturing an electrode with a sufficient capacity is required to be developed. It is also required to simplify such a method for manufacturing an electrode to facilitate mass production of storage batteries.

An object of one embodiment of the present invention is to provide a method for stably manufacturing a storage battery electrode with high capacity.

Another object of one embodiment of the present invention is to simplify a method for manufacturing a storage battery.

Another object of one embodiment of the present invention is to provide a storage battery electrode with a uniform thickness. Another object of one embodiment of the present invention is to provide a storage battery electrode with high strength and a storage battery with high strength.

Another object of one embodiment of the present invention is to provide a novel electrode, a novel storage battery, a novel method for manufacturing an electrode, or the like. Note that the descriptions of these objects do not preclude the existence of other objects. In one embodiment of the present invention, there is no need to achieve all the objects. One embodiment of the present invention achieves at least one of the above objects. Other objects will be apparent from and can be derived from the descriptions of the specification, the drawings, the claims, and the like.

One embodiment of the present invention is a method for manufacturing a storage battery electrode, including the steps of forming an active material; forming a mixture of an oxidized derivative of a first conductive additive and the active material; measuring the basicity using a part of the mixture; and forming a slurry using another part of the mixture and a binder only in the case where the measured basicity is within a predetermined range.

The active material is in the form of powder. An aqueous solution obtained by mixing the active material and water with a pH of 7 at a weight ratio of 1:10 may have a pH of greater than or equal to 10 and less than or equal to 14, or greater than or equal to 11.1 and less than or equal to 12.5. In the step of measuring the basicity, the part of the mixture may be dried to be powdered, and then the hydrogen-ion concentration of an aqueous solution obtained by mixing the powdered mixture and water with a given pH at a predetermined ratio may be measured.

In the above, the water with a predetermined pH may have a pH of 7, the predetermined ratio may be a weight ratio of the powdered mixture to the water of 1:10, and the predetermined range may be a pH range of greater than or equal to 7.0 and less than 11.1, or greater than or equal to 10 and less than or equal to 11.

One embodiment of the present invention is a method for manufacturing a storage battery electrode, including the steps of forming an active material; forming a mixture of an oxidized derivative of a first conductive additive and the active material; and forming a slurry using a binder and the mixture. The active material is in the form of powder. An aqueous solution obtained by mixing the active material and water with a pH of 7 at a weight ratio of 1:10 has a pH of greater than or equal to 10 and less than or equal to 14, or greater than or equal to 11.1 and less than or equal to 12.5.

An aqueous solution obtained by mixing a powdered mixture obtained by drying the mixture and water with a pH of 7 at a weight ratio of 1:10 may have a pH of greater than or equal to 7.0 and less than 11.1, or greater than or equal to 10 and less than or equal to 11.

In the above, the step of filtrating the slurry may be included.

The mixture may include a substance generated by reduction of the oxidized derivative of the first conductive additive.

The step of reducing the slurry may be included. Alternatively, the step of reducing the slurry that is applied on a current collector may be included.

The oxidized derivative of the first conductive additive may be graphene oxide. Graphene oxide which satisfies the following may be used: an aqueous solution obtained by mixing graphene oxide and water with a pH of 7 at a weight ratio of 1:10 has a pH of greater than or equal to 0.5 and less than or equal to 2.0, preferably greater than or equal to 0.9 and less than or equal to 1.2.

The binder may include a second conductive additive. The second conductive additive may be acetylene black. The binder may include polyvinylidene fluoride.

According to one embodiment of the present invention, a method for stably manufacturing a storage battery electrode with high capacity can be provided.

According to one embodiment of the present invention, a method for manufacturing a storage battery can be simplified.

One embodiment of the present invention makes it possible to prevent a mixture used for forming an active material layer from being a strongly basic mixture, to prevent aggregation of an active material in an active material layer, and to prevent a binder from being gelled. Accordingly, one embodiment of the present invention can provide an electrode including an active material layer with a uniform thickness and can provide an electrode with high strength and a storage battery with high strength.

With one embodiment of the present invention, a novel electrode, a novel storage battery, a novel method for manufacturing an electrode, or the like can be provided. Note that the descriptions of these effects do not preclude the existence of other effects. One embodiment of the present invention does not necessarily have all the effects. Other effects will be apparent from and can be derived from the descriptions of the specification, the drawings, the claims, and the like.

BRIEF DESCRIPTION OF THE DRAWINGS

In the accompanying drawings:

FIG. 4 illustrates a crystal structure;

FIG. 6 is a flow chart showing a method for manufacturing a storage battery electrode;

FIG. 7 is a flow chart showing a method for manufacturing a storage battery electrode;

FIG. 8 is a flow chart showing a method for manufacturing a storage battery electrode;

DETAILED DESCRIPTION OF THE INVENTION

Figure 1:
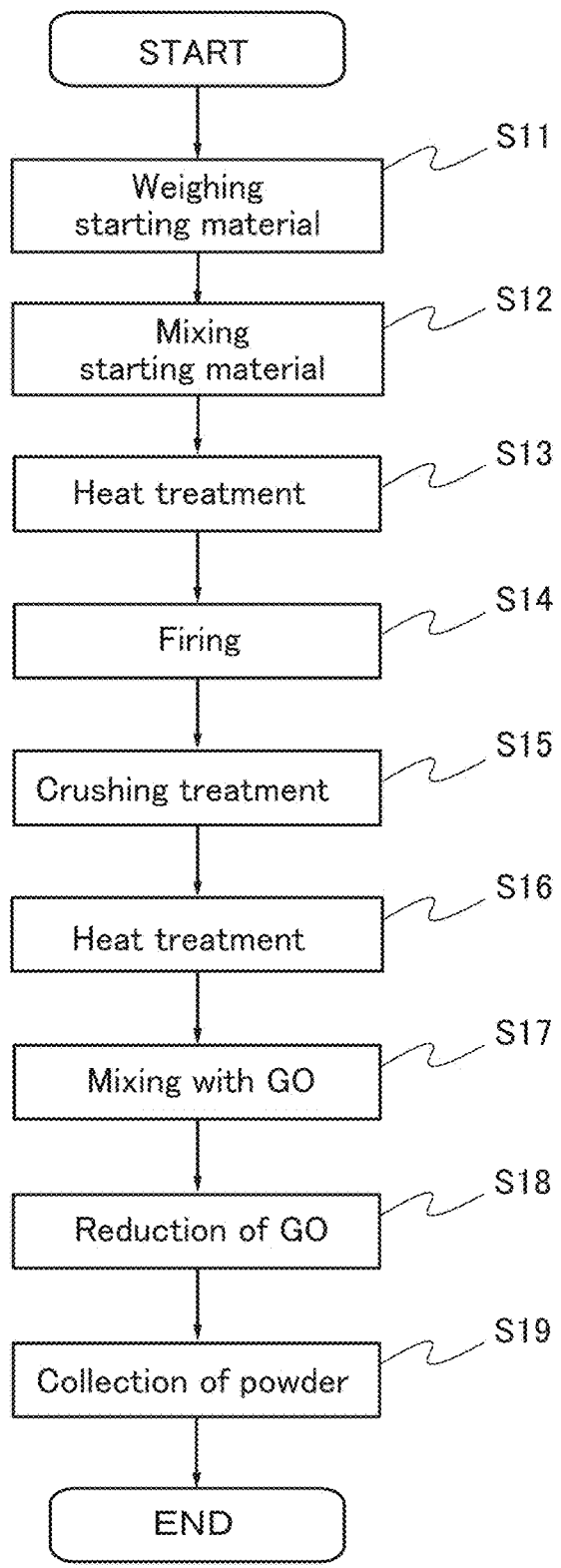
FIG. 1 is a flow chart showing a method for forming an active material.

Embodiments will be described below with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Note that in the structures of the invention described below, the same portions or portions having similar functions are denoted by the same reference numerals in different drawings, and description of such portions is not repeated. Furthermore, the same hatch pattern is applied to similar functions, and these are not denoted by particular reference numerals in some cases.

Note that in the drawings used in this specification, the thicknesses of films, layers, and substrates, the sizes of regions, and the like are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Embodiment 1

Figure 2:
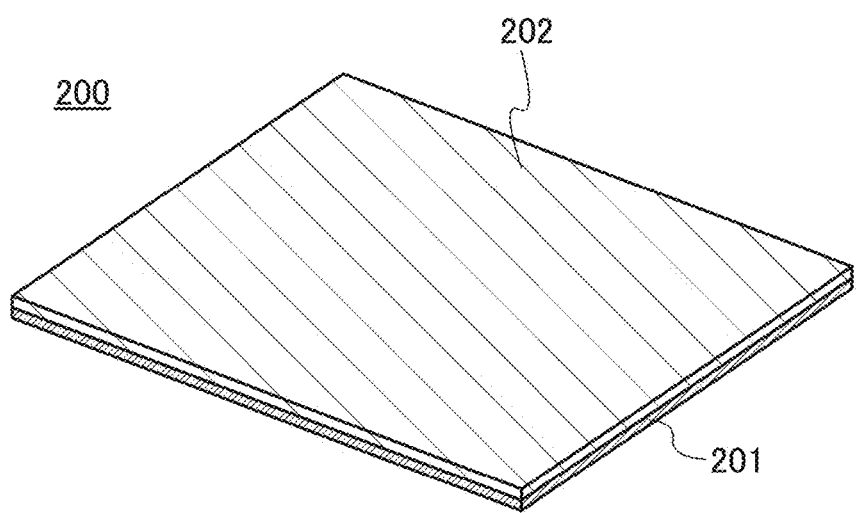
FIG. 2 is a perspective view of a storage battery electrode.

In this embodiment, a storage battery electrode will be described with reference to FIG. 2 and FIGS. 3A and 3B. FIG. 2 is a perspective view of an electrode, and FIGS. 3A and 3B are cross-sectional views each illustrating an active material particle.

FIG. 2 is a perspective view of an electrode 200. Although the electrode 200 in the shape of a rectangular sheet is illustrated in FIG. 2, the shape of the electrode 200 is not limited thereto and may be any appropriate shape. An active material layer 202 is formed on only one side of a current collector 201 in FIG. 2; however, the active material layer 202 may be formed on both sides of the current collector 201. The active material layer 202 does not necessarily need to be formed over the entire surface of the current collector 201 and a region that is not coated, such as a region for connection to a tab, is provided as appropriate.

The current collector 201 can be formed using a highly conductive material that is not alloyed with a carrier ion of lithium or the like, for example, a metal such as stainless steel, gold, platinum, zinc, iron, copper, aluminum, and titanium or an alloy thereof. Alternatively, an aluminum alloy to which an element which improves heat resistance, such as silicon, titanium, neodymium, scandium, and molybdenum, is added can be used. Further alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 201 can have a foil-like shape, a plate-like shape (sheet-like shape), a net-like shape, a punching-metal shape, an expanded-metal shape, or the like as appropriate. The current collector 201 preferably has a thickness greater than or equal to 10 μm and less than or equal to 30 μm. A surface of the current collector 201 may be provided with an undercoat layer using graphite or the like.

Figure 3A:
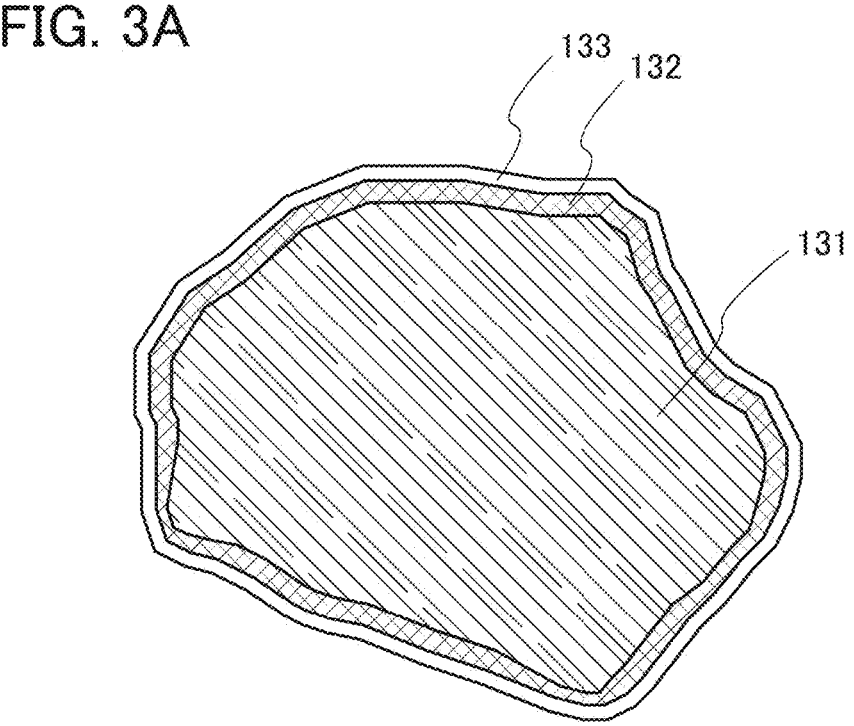
FIGS. 3A and 3B each illustrate a cross section of an active material particle.
Figure 3B:
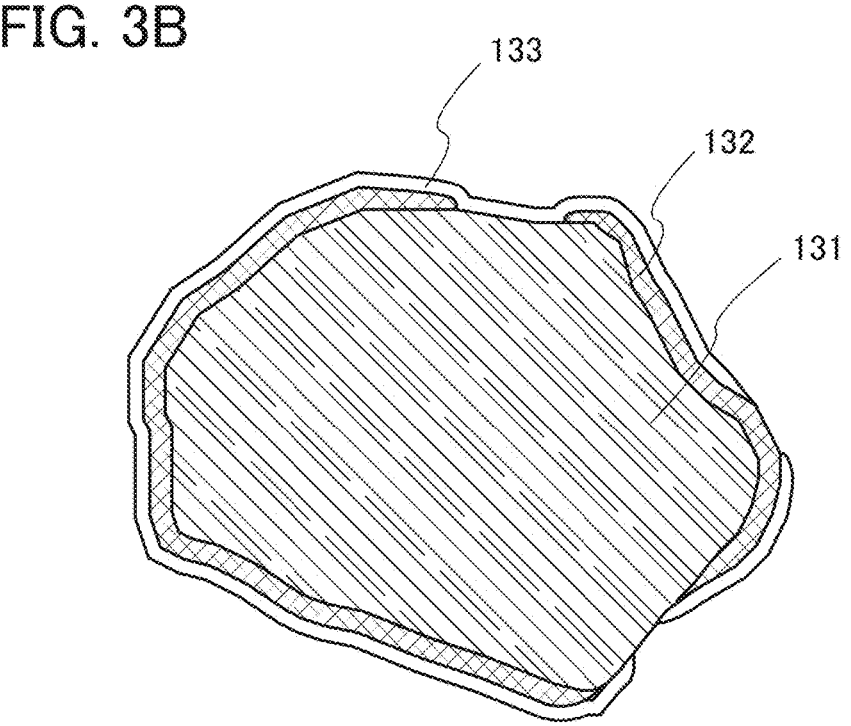

FIGS. 3A and 3B are schematic cross-sectional views each illustrating an active material particle included in the active material layer 202 of the electrode 200.

A region 133 is formed to cover the outer circumference of the active material particle. The region 133 includes any of graphene, reduced graphene oxide, and a graphene compound. As illustrated in FIGS. 3A and 3B, the active material particle may include two regions of a region 131 and a region 132. The region 133 may be provided for the entire surface of the active material particle or part of the surface thereof. The region 133 is preferably formed so as to cover an exposed cleavage plane of an active material particle. The region 133 is formed on at least part of the cleavage plane of the active material particle. When the active material particle in which at least part of the cleavage plane is covered with the region 133 is used for an electrode, a decrease in the voltage and discharge capacity of a battery can be prevented. Accordingly, the charge-discharge cycle characteristics of the battery can be improved.

Graphene has excellent electrical characteristics of high conductivity and excellent physical properties of high flexibility and high mechanical strength. For this reason, in a battery including an electrode containing the active material particle, a lithium-manganese complex oxide can be prevented from being further cleaved and cracked because of the volume change even when the lithium-manganese complex oxide repeats expansion and contraction accompanying repeated charging and discharging of the battery.

An active material layer includes a plurality of active material particles. The plurality of active material particles are in contact with each other, so that an electric conduction path is formed. As for the contact state, graphene formed to cover a surface of an active material particle may be in contact with graphene formed to cover a surface of an adjacent active material particle. Alternatively, a portion of an active material particle where graphene is not formed is in contact with a portion of another active material particle where graphene is formed in some cases; portions of surfaces of active material particles where graphene is not formed are in contact with each other in other cases. When an active material layer includes a plurality of active material particles, contact between the plurality of active material particles allows contact between graphene formed over surfaces of the active material particles; thus, a three-dimensional electric conduction path is formed, which enables conductivity of the active material layer to be ensured.

In a method for manufacturing a storage battery electrode to be described in Embodiment 2, graphene is formed by reduction of graphene oxide with a reducing agent. Since an active material, graphene oxide, and a reducing agent are mixed in the method for manufacturing a storage battery electrode, the reducing agent may remain in the active material layer 202. The reducing agent is oxidized at the time when the graphene oxide is reduced. Thus, the active material layer 202 may include a derivative generated when the reducing agent is oxidized (hereinafter, the derivative is called an oxidized derivative of a reducing agent).

The reducing agent or the oxidized derivative of the reducing agent in the active material layer 202 can be detected by an analytical method such as energy dispersive X-ray spectrometry (EDX), X-ray photoelectron spectroscopy (XPS), or time-of-flight secondary ion mass spectrometry (ToF-SIMS).

Examples of the reducing agent include ascorbic acid, hydrazine, dimethyl hydrazine, hydroquinone, sodium tetrahydroborate ($NaBH_4$), lithium aluminum hydride ($LiAlH_4$), N,N-diethylhydroxylamine, and a derivative thereof. In particular, ascorbic acid and hydroquinone are preferable to hydrazine and $NaBH_4$ in that they are safe due to low reducing ability and utilized industrially with ease.

The reduction reaction of the graphene oxide makes the reducing agent to be the oxidized derivative of the reducing agent. Here, a redox reaction of ascorbic acid is described as an example. Ascorbic acid becomes dehydroascorbic acid when oxidized. Thus, in the case of using ascorbic acid as the reducing agent, dehydroascorbic acid may remain in the active material layer 202 as the oxidized derivative of the reducing agent. Even when a reducing agent other than ascorbic acid is used, the oxidized derivative of the reducing agent may remain in the active material layer 202.

Graphene is a carbon material having a crystal structure in which hexagonal skeletons of carbon are spread in a planar form and is one atomic plane extracted from graphite crystals. Due to its surprisingly excellent electrical, mechanical, or chemical characteristics, graphene has been expected to be used for a variety of fields of, for example, field-effect transistors with high mobility, highly sensitive sensors, highly-efficient solar cells, and next-generation transparent conductive films, and has attracted a great deal of attention.

Note that graphene in this specification refers to single-layer graphene or multilayer graphene including two or more and one hundred or less layers. Single-layer graphene refers to a one-atom-thick sheet of carbon molecules having π bonds. Graphene oxide refers to a compound formed by oxidation of such graphene. When graphene oxide is reduced to give graphene, oxygen contained in the graphene oxide is not entirely released and part of the oxygen may remain in graphene. With the method for manufacturing a storage battery electrode to be described in Embodiment 2, the reduction efficiency of the graphene oxide can be increased. The proportion of oxygen in the graphene, which is measured by XPS, is higher than or equal to 2 atomic % and lower than or equal to 20 atomic %, and preferably higher than or equal to 3 atomic % and lower than or equal to 15 atomic %.

Graphene oxide can be formed by an oxidation method called a Hummers method. In the Hummers method, a sulfuric acid solution of potassium permanganate, a hydrogen peroxide solution, and the like are mixed into graphite powder to cause an oxidation reaction; thus, a mixed solution containing graphite oxide is formed. Through the oxidation of carbon of graphite, functional groups such as epoxy groups, carbonyl groups, carboxyl groups, or hydroxyl groups are bonded in graphite oxide. Accordingly, the interlayer distance between a plurality of sheets of graphene in graphite oxide becomes longer than the interlayer distance in graphite, so that graphite oxide can be easily separated into thin pieces by interlayer separation. Then, ultrasonic vibration is applied to the mixed solution containing graphite oxide, so that graphite oxide whose interlayer distance is long can be cleaved to separate graphene oxide and to form a mixed solution containing graphene oxide. A solvent is removed from the mixed solution containing graphene oxide, so that graphene oxide powder can be obtained.

The graphene oxide may be formed by adjusting the amount of an oxidizing agent such as potassium permanganate as appropriate. When the amount of the oxidizing agent with respect to the graphite powder is increased, for example, the degree of oxidation of the graphene oxide (the ratio of oxygen to carbon) can be increased. The amount of the oxidizing agent with respect to the graphite powder, which is a raw material, can be determined depending on the amount of graphene oxide to be manufactured.

Note that the method for forming graphene oxide is not limited to the Hummers method using a sulfuric acid solution of potassium permanganate; for example, the Hummers method using nitric acid, potassium chlorate, nitric acid sodium, or the like or a method for forming graphene oxide other than the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In the graphene oxide, oxygen in a functional group is negatively charged in a polar solvent typified by NMP; therefore, while interacting with NMP, the graphene oxide repels with other graphene oxides and is hardly aggregated. For this reason, in a polar solvent, graphene oxides can be easily dispersed uniformly.

The active material is in the form of particles (made of secondary particles) having average particle diameter and particle diameter distribution, which is obtained in such a way that material compounds are mixed at a predetermined ratio and baked and the resulting baked product is crushed, granulated, and classified by an appropriate means. Therefore, although the active material particle (the region 131 and the region 132) is schematically illustrated in each of FIGS. 3A and 3B, the shape of the active material is not limited to these shapes.

In the case of using the electrode 200 as a positive electrode of a storage battery, a material into and from which lithium ions can be inserted and extracted can be used for the active material. For example, a lithium-manganese-containing complex oxide with an olivine crystal structure, a layered rock-salt crystal structure, or a spinel crystal structure can be used. Note that one of the region 131 and the region 132 has inferior capability of insertion and extraction of lithium to the other in some cases.

As an example of a lithium-containing complex phosphate with an olivine crystal structure, a complex phosphate represented by a general formula $LiMPO_4$ (M is one or more of Fe(II), Mn(II), Co(II), and Ni(II)) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, and $0<e<1$), and $LiFe_fNi_gCo_hMn_iPO_4$ ($f+g+h+i\leq1$, $0<f<1$, $0<g<1$, $0<h<1$, and $0<i<1$).

$LiFePO_4$ is particularly preferable because it properly has properties necessary for the active material, such as safety, stability, high capacity density, high potential, and the existence of lithium ions that can be extracted in initial oxidation (charging).

Examples of a lithium oxide with a layered rock-salt crystal structure include $LiCoO_2$, $LiNiO_2$, $LiMnO_2$, $Li_2MnO_3$, a NiCo-based compound such as $LiNi_{0.8}Co_{0.2}O_2$ (general formula: $LiNi_xCo_{1-x}O_2$ ($0<x<1$)), a NiMn-based compound such as $LiNi_{0.5}Mn_{0.5}O_2$ (general formula: $LiNi_xMn_{1-x}O_2$ ($0<x<1$)), a NiMnCo-based compound such as $LiNi_{1/3}Mn_{1/3}CO_{1/3}O_2$ (also referred to as NMC, general formula: $LiNi_xMn_yCo_{1-x-y}O_2$ ($x>0$, $y>0$, $x+y<1$)), $Li(Ni_{0.8}Co_{0.15}Al_{0.05})O_2$, and $Li_2MnO_3$—$LiMO_2$ (M=Co, Ni, or Mn).

$LiCoO_2$ is particularly preferable because of its high capacity, and its stability in the air and thermal stability higher than those of $LiNiO_2$.

Examples of a lithium-manganese-containing complex oxide with a spinel crystal structure include $LiMn_2O_4$, $Li_{1+x}Mn_{2-x}O_4$ ($0<x<2$), $LiMn_{2-x}Al_xO_4$ ($0<x<2$), and $LiMn_{1.5}Ni_{0.5}O_4$.

It is preferable to add a small amount of lithium nickel oxide ($LiNiO_2$ or $LiNi_{1-x}M_xO_2$ ($0<x<1$, M=Co, Al, or the like)) to the lithium-manganese-containing complex oxide with a spinel crystal structure such as $LiMn_2O_4$, in which case the dissolution of manganese and the decomposition of an electrolyte solution can be suppressed, for example.

A complex silicate represented by a general formula $Li_{(2-j)}MSiO_4$ (M is one or more of Fe(II), Mn(II), Co(II), and Ni(II), $0\leq j\leq2$) can also be used as the positive electrode active material. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq1$, $0<m<1$, $0<n<1$, and $0<q<1$), and $Li_{(2-j)}Fe_rNi_sCo_tMn_uSiO_4$ ($r+s+t+u\leq1$, $0<r<1$, $0<s<1$, $0<t<1$, and $0<u<1$).

A nasicon compound represented by a general formula $A_xM_2(XO_4)_3$ (A=Li, Na, or Mg, M=Fe, Mn, Ti, V, Nb, or Al, and X=S, P, Mo, W, As, or Si) can also be used as the positive electrode active material. Examples of the nasicon compound include $Fe_2(MnO_4)_3$, $Fe_2(SO_4)_3$, and $Li_3Fe_2(PO_4)_3$. Alternatively, a compound represented by a general formula $Li_2MPO_4F$, $Li_2MP_2O_7$, or $Li_5MO_4$ (M=Fe or Mn), a perovskite fluoride such as $FeF_3$, a metal chalcogenide (a sulfide, a selenide, or a telluride) such as $TiS_2$ or $MoS_2$, a lithium-vanadium-containing complex oxide with an inverse spinel structure such as $LiMVO_4$, a vanadium oxide-based compound (such as $V_2O_5$, $V_6O_{13}$, or $LiV_3O_8$), a manganese oxide, an organic sulfur compound, or the like can be used as the positive electrode active material.

Another example of the positive electrode active material is a lithium-manganese complex oxide that is represented by a composition formula $Li_aMn_bM_cO_d$. Here, the element M is preferably a metal element other than lithium and manganese, silicon, or phosphorus, more preferably nickel. Furthermore, in the case where the whole particle of a lithium-manganese complex oxide is measured, it is preferable to satisfy the following at the time of discharging: $0<a/(b+c)<2$; $c/b>0$ (preferably $0.3<c/b<0.5$, typically $c/b$ of approximately 0.4); and $0.26\leq(b+c)/d<0.5$. Note that the ratios of metal, silicon, phosphorus, and other elements to the total composition in the whole particle of a lithium-manganese complex oxide can be measured with, for example, an inductively coupled plasma mass spectrometer (ICP-MS). The ratio of oxygen to the total composition in the whole particle of a lithium-manganese complex oxide can be measured by, for example, EDX. Alternatively, the ratio of oxygen to the total composition in the whole particle of a lithium-manganese complex oxide can be measured by ICP-MS combined with fusion gas analysis and valence evaluation of X-ray absorption fine structure (XAFS) analysis. Note that the lithium-manganese complex oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

A manganese compound and a lithium compound can be used as raw materials of the lithium-manganese complex oxide. In addition to the manganese compound and the lithium compound, a compound containing at least one selected from chromium, cobalt, aluminum, nickel, iron, magnesium, molybdenum, zinc, indium, gallium, copper, titanium, niobium, silicon, phosphorus, and the like can be used as a raw material. Examples of the manganese compound are manganese dioxide, dimanganese trioxide, trimanganese tetroxide, manganese oxide hydrate, manganese carbonate, and manganese nitrate. Examples of the lithium compound are lithium hydroxide, lithium carbonate, and lithium nitrate.

A particle including a lithium-manganese complex oxide may have a first region and a second region. In addition, the particle including a lithium-manganese complex oxide may have a third region.

The diameter of the positive electrode active material particle is preferably, for example, greater than or equal to 5 nm and less than or equal to 100 μm.

The second region is in contact with at least part of the outside of the first region. Here, the term "outside" refers to the side closer to a surface of a particle. The third region is preferably in contact with at least part of the outside of the second region.

In the case where the second region includes a layered region, the thickness of the layered region is preferably greater than or equal to 0.1 nm and less than or equal to 30 nm, more preferably greater than or equal to 1 nm and less than or equal to 15 nm.

The first region and the second region contain lithium and oxygen. At least one of the first region and the second region contains manganese. At least one of the first region and the second region contains the element M.

More preferably, the first region and the second region contain both manganese and the element M.

The third region preferably includes a region corresponding to a surface of a particle containing the lithium-manganese complex oxide.

In the case where the third region includes a layered region, the thickness of the layered region is preferably greater than or equal to 0.1 nm and less than or equal to 30 nm, more preferably greater than or equal to 1 nm and less than or equal to 20 nm, much more preferably greater than or equal to 2 nm and less than or equal to 10 nm.

FIG. 3A shows an example in which a particle includes a region 131 as the first region, a region 132 as the second region, and a region 133 as the third region.

As shown in FIG. 3A, at least part of the region 132 is in contact with a surface of the region 131. At least part of the region 133 is in contact with a surface of the region 132.

As shown in FIG. 3B, the region 131 may include a region not covered with the region 132. The region 132 may include a region not covered with the region 133. For example, the region 131 may include a region in contact with the region 133. The region 131 may include a region covered with neither the region 132 nor the region 133.

In the case where a power storage device is fabricated using the particle containing the lithium-manganese complex oxide, the third region is preferably more stable than the first region and the second region against a battery reaction, e.g., charging and discharging.

The second region may include a crystal structure different from that of the first region. The second region may include a crystal whose orientation is different from that of the first region.

It is preferable that the second region have a spinel structure and that the first region have a layered rock-salt structure, for example.

Alternatively, it is preferable that the first region and the second region have a layered rock-salt structure and that a first plane of a crystal included in the first region be parallel to a second plane of a crystal included in the second region, for example.

Here, in the case where the first plane is a {0 0 1} plane of the layered rock-salt structure, the {0 0 1} plane of the layered rock-salt structure is preferably parallel to at least one of a {1 0 0} plane, a {1 3 –1} plane, and a {–1 3 1} plane of a crystal included in the second region. Alternatively, in the case where the first plane is a {1 0 0} plane of the layered rock-salt structure, the {1 0 0} plane of the layered rock-salt structure is preferably at least parallel to at least one of a {0 0 1} plane, a {1 3 –1} plane, and a {–1 3 1} plane of a crystal included in the second region. Alternatively, in the case where the first plane is a {1 3 –1} plane of the layered rock-salt structure, the {1 3 –1} plane of the layered rock-salt structure is preferably parallel to at least one of a {0 0 1} plane, a {1 0 0} plane, and a {–1 3 1} plane of a crystal included in the second region. Alternatively, in the case where the first plane is a {–1 3 1} plane of the layered rock-salt structure, the {–1 3 1} plane of the layered rock-salt structure is preferably parallel to at least one of a {0 0 1} plane, a {1 0 0} plane, and a {1 3 –1} plane of a crystal included in the second region.

It is preferable that the first region and the second region have a layered rock-salt structure and that a first orientation of the crystal included in the first region be parallel to a second orientation of the crystal included in the second region, for example. Crystal orientations of the crystal included in the first region and the crystal included in the second region will be described.

Here, a first group includes three crystal orientations of <1 0 0>, <1 1 0>, and <–1 1 0>, a second group includes <0 0 1>, <0 1 1>, and <0 1 –1>, a third group includes <–3 2 3>, <3 1 6>, and <6 –1 3>, and a fourth group includes <3 2 –3>, <3 –1 6>, and <6 1 3>.

The crystal included in the first region has an orientation selected from the orientations in one of the first to fourth groups. The crystal included in the second region has an orientation selected from the orientations in one of three groups other than the group from which the orientation of the crystal included in the first region is selected.

A specific combination example will be described below. Description will be made on the (0 0 1) plane and the (1 0 0) plane. In the following description, indices are written using notation in which the symmetry of a crystal is not taken into consideration in order to be written specifically.

Figure 5A:
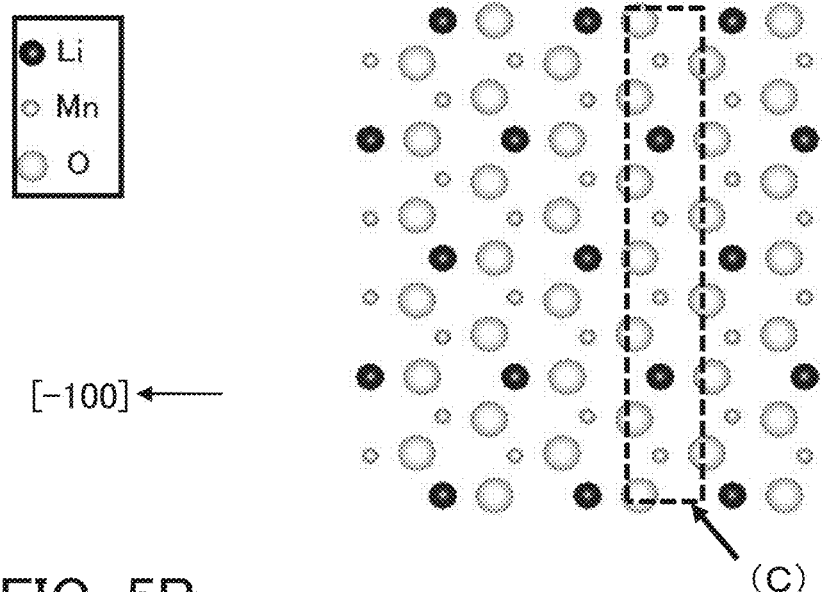
FIGS. 5A and 5B each illustrate a crystal structure.

FIG. 4 shows a crystal structure of $Li_2MnO_3$ seen in the negative direction of a b-axis. FIG. 5A shows a layer A-1 and a layer A-2 in a region surrounded by dashed line A shown in FIG. 4. In FIG. 5A, the layer A-1 and the layer A-2 are observed from the layer A-2 side in a direction perpendicular to the layer A-1 and the layer A-2. The layer A-1 contains oxygen, and the layer A-2 contains lithium and manganese.

Figure 5B:
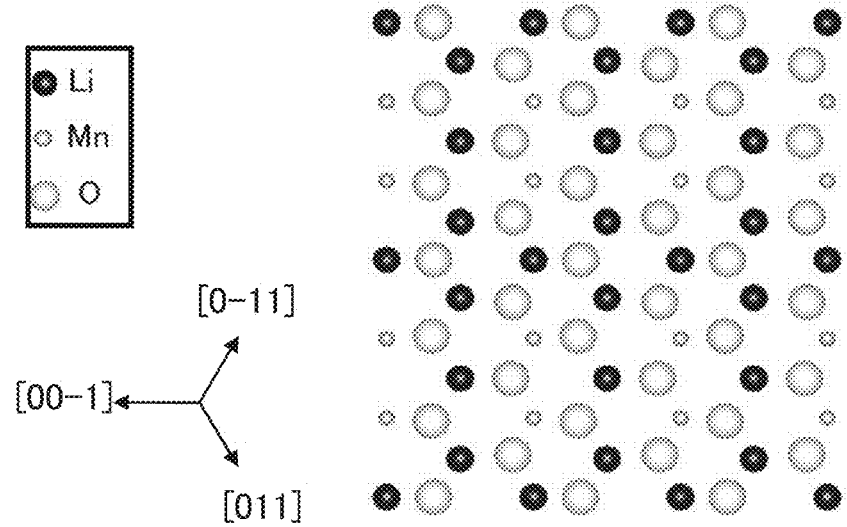

FIG. 5B shows a layer B-1 and a layer B-2 in a region surrounded by dashed line B shown in FIG. 4. In FIG. 5B, the layer B-1 and the layer B-2 are observed from the layer B-2 side in a direction perpendicular to the layer B-1 and the layer B-2.

In FIG. 5A, lithium or manganese is stacked over an oxygen atom and is shifted in a [110] direction, a [−100] direction, or a [1−10] direction. Similarly, in FIG. 5B, lithium or manganese is stacked over a hexagonal structure formed by oxygen and is shifted in a [0−11] direction, a [00−1] direction, or a [011] direction. When manganese is changed to lithium in a region surrounded by dashed line C in FIG. 5A, a structure similar to that of FIG. 5B is obtained. That is, the positions of metal atoms in FIGS. 5A and 5B are approximately the same, though the kinds of the metal atoms are different. Thus, it is probable that the two structures have many common parts and are therefore compatible with each other when stacked.

The second region preferably has composition different from that of the first region.

For example, the case is described where the composition of the first region and that of the second region are separately measured and the first region and the second region each contain lithium, manganese, the element M, and oxygen; the atomic ratio of lithium to manganese, the element M, and oxygen in the first region is represented by a1:b1:c1:d1; and the atomic ratio of lithium to manganese, the element M, and oxygen in the second region is represented by a2:b2:c2:d2. Note that the composition of each of the first region and the second region can be measured by, for example, EDX using a transmission electron microscope (TEM). In measurement by EDX, the proportion of lithium is sometimes difficult to measure. Thus, a difference between the first region and the second region in composition except for lithium is described below. Here, d1/(b1+c1) is preferably greater than or equal to 2.2, more preferably greater than or equal to 2.3, much more preferably greater than or equal to 2.35 and less than or equal to 3. Furthermore, d2/(b2+c2) is preferably less than 2.2, more preferably less than 2.1, much more preferably greater than or equal to 1.1 and less than or equal to 1.9. Also in this case, the composition of the whole particle of the lithium-manganese complex oxide including the first region and the second region preferably satisfies 0.26 (b+c)/d<0.5 as described above.

The valence of manganese in the second region may be different from that of manganese in the first region. The valence of the element M in the second region may be different from that of the element M in the first region.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region and the first region. Here, the transition layer is a region where composition is changed continuously or gradually, a region where a crystal structure is changed continuously or gradually, or a region where the lattice constant of a crystal is changed continuously or gradually.

A mixed layer may be provided between the second region and the first region. The mixed layer is a layer in which, for example, two or more crystals having different crystal orientations are mixed, two or more crystals having different crystal structures are mixed, or two or more crystals having different compositions are mixed.

Here, the first region preferably has a layered rock-salt structure, and the second region preferably has at least one of a spinel structure and a layered rock-salt structure.

In the case where a storage battery or the like is manufactured using the "particle containing the lithium-manganese complex oxide", the first region to the third region may be formed in any of the steps before the completion of the storage battery.

For example, the first region to the third region may be formed before the formation of the electrode, e.g., after the synthesis of the particle. Alternatively, the first region to the third region may be formed in forming the electrode. The thickness, the composition, the crystal structure, and the like of the first region to the third region which are formed after the synthesis of the particle, for example, may be changed in the formation of the electrode.

The first region to the third region may be formed in heat treatment in any of steps in a process for manufacturing the storage battery or the like.

In a process for forming the lithium-manganese complex oxide, a crushing step of the lithium-manganese complex oxide (Step S15, for example) in which primary particles are sintered is important because the step influences the characteristics of a battery. In the crushing step, a shear (grinding stress) is applied to the lithium-manganese complex oxide in which the primary particles are sintered, whereby a powdery lithium-manganese complex oxide is formed. In the case where the lithium-manganese complex oxide has a layered rock-salt crystal structure, a primary particle might be cleaved and cracked along a plane parallel or perpendicular to the layer at this time. The cleaved and cracked primary particle is called a particle having a cleavage plane or a particle with a cleavage plane exposed, in this specification and the like. Note that some cracked primary particles do not have a cleavage plane.

An active material particle having a cleavage property, such as the lithium-manganese complex oxide having a layered rock-salt crystal structure might be cracked not only in the crushing step but also in a formation process of an electrode because a pressure is applied to an active material layer when the electrode is pressurized.

When a wound battery is formed, a great stress is caused at the time of winding an electrode. Even when a wound body of the electrode is stored in a housing, the active material particle might be further cracked because an outward stress from an axis of winding is caused all the time.

Such cleavage and cracking of the primary particle of the lithium-manganese complex oxide cause a decrease in the discharge capacity and cycle characteristics of a battery.

Also in the above-described case, a layer containing carbon is preferably formed on at least part of a cleavage plane of the lithium-manganese complex oxide. The layer containing carbon may cover the entire cleavage plane or the whole lithium-manganese complex oxide having a cleavage plane.

Graphene may be provided as the layer containing carbon. The graphene may be formed on either the whole or part of the surface of the lithium-manganese complex oxide. The graphene is preferably formed so as to cover an exposed cleavage plane of a particle. The position of the graphene is not limited in particular as long as the graphene is formed on at least part of a cleavage plane of the lithium-manganese complex oxide. When the active material particle in which at least part of the cleavage plane is covered with graphene is used for an electrode, a decrease in the voltage and discharge capacity of a battery can be prevented. Accordingly, the charge-discharge cycle characteristics of the battery can be improved.

Graphene has excellent electrical characteristics of high conductivity and excellent physical properties of high flexibility and high mechanical strength. For this reason, in a battery including an electrode containing the active material particle, a lithium-manganese complex oxide can be prevented from being further cleaved and cracked because of the volume change even when the lithium-manganese complex oxide repeats expansion and contraction accompanying repeated charging and discharging of the battery.

In addition, pressure applied to the active material particle, which is due to pressure applied to the electrode in a formation process of the electrode, can be alleviated owing to the mechanical strength of graphene. Thus, the active material particle can be prevented from being further cleaved and cracked.

Moreover, even when a great stress is caused at the time of winding an electrode of a wound battery or even when an outward stress from an axis of winding is applied to the electrode all the time in the case where a wound body of the electrode is stored in a housing, the active material particle can be prevented from being further cleaved and cracked by the stress.

Note that the positive electrode active material exhibits basicity in some cases. Therefore, when a binder, a conductive additive, and a solvent used in the step of manufacturing an electrode are mixed with the positive electrode active material to form a slurry or a paste, gelation of the binder is accelerated by the basic positive electrode active material and the viscosity of the slurry or the paste extremely increases, which makes it difficult to manufacture an electrode in some cases. For example, a lithium-manganese complex oxide exhibits basicity. Although the basicity of a lithium-manganese complex oxide is difficult to measure because of its insolubility in water, the pH of an aqueous solution obtained by mixing a lithium-manganese complex oxide and water with a pH of 7 at a weight ratio of 1:10 is greater than or equal to 10 and less than or equal to 14, typically greater than or equal to 11.1 and less than or equal to 12.5, for example.

In contrast, an aqueous solution of graphene oxide exhibits acidity. Thus, when a lithium-manganese complex oxide is added to an aqueous solution of graphene oxide, an acid-base reaction is caused, and the basicity of the lithium-manganese complex oxide is lowered.

As a result, even when the binder and the conductive additive are added and mixed in a later step, gelation of the slurry or the paste can be suppressed. Addition of a lithium-manganese complex oxide to an aqueous solution of graphene oxide is effective in stably manufacturing an electrode because it widens margins in the later steps of mixing with the binder and the conductive additive and applying the mixture on the current collector.

In the case where carrier ions are alkali metal ions other than lithium ions, or alkaline-earth metal ions, the positive electrode active material may contain, instead of lithium in the lithium compound or the lithium-manganese complex oxide, an alkali metal (e.g., sodium or potassium) or an alkaline-earth metal (e.g., calcium, strontium, barium, beryllium, or magnesium).

In the case where the storage battery electrode to be manufactured is used as a negative electrode of a storage battery, a material that enables charge-discharge reactions by an alloying reaction and a dealloying reaction with lithium can be used as the active material.

As the material that enables charge-discharge reactions by an alloying reaction and a dealloying reaction with lithium, a carbon-based material can be given. Examples of the carbon-based material are graphite, graphitizing carbon (soft carbon), non-graphitizing carbon (hard carbon), a carbon nanotube, graphene, and carbon black. Examples of the graphite are artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the material that enables charge-discharge reactions by an alloying reaction and a dealloying reaction with lithium, a material containing at least one of Ga, Si, Al, Ge, Sn, Pb, Sb, Bi, Ag, Zn, Cd, In, and the like can also be used, for example. Such elements have higher capacity than carbon. In particular, silicon has a significantly high theoretical capacity of 4200 mAh/g. Examples of the material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

As the negative electrode active material, an oxide such as SiO, SnO, $SnO_2$, titanium dioxide, a lithium titanium oxide, a lithium-graphite intercalation compound, niobium pentoxide, tungsten oxide, or molybdenum oxide can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that even in the case of using a material including lithium ions as a positive electrode active material, the nitride including lithium and a transition metal can be used as the negative electrode active material by extracting lithium ions included in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The average diameter of primary particles of the lithium-manganese complex oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average diameter of secondary particles is preferably greater than or equal to 5 μm and less than or equal to 50 μm. Note that the average particle diameter can be measured with a particle diameter distribution analyzer or the like using a laser diffraction and scattering method or by observation with a scanning electron microscope (SEM) or a TEM. The specific surface area can be measured by a gas adsorption method.

The active material layer 202 may contain a second conductive additive. In the case where the active material layer 202 contains graphene and the second conductive additive, the three-dimensional electric conduction network in the active material layer can be more complicated. In that case, an electric conduction path in the active material layer 202 can be prevented from being cut while the power storage device is used. For the second conductive additive, natural graphite, artificial graphite such as meso-carbon microbeads, or carbon fiber can be used. Alternatively, metal powder or metal fiber of copper, nickel, aluminum, silver, gold, or the like, a conductive ceramic material, or the like can be used.

Examples of carbon fiber include mesophase pitch-based carbon fiber, isotropic pitch-based carbon fiber, carbon nanofiber, carbon nanotube, and vapor-grown carbon fiber (VGCF, registered trademark). The representative values of VGCF (registered trademark) are as follows: the fiber diameter is 150 nm; the fiber length is 10 μm to 20 μm, inclusive; the real density is 2 $g/cm^3$; and the specific surface area is 13 $m^2/g$. Note that when a cross section perpendicular to a fiber axis is regarded as a cutting plane in a two-dimensional SEM image, the fiber diameter is a diameter of a perfect circle that circumscribes the cutting plane. The real density is a density calculated using a volume occupied by a substance itself. The specific surface area is the surface area of an object per unit mass or per unit volume.

In addition, VGCF (registered trademark), which has a needle-like shape, has an excellent electrical characteristic of high conductivity and an excellent physical property of high mechanical strength. For this reason, the use of VGCF (registered trademark) as the conductive additive can increase the points and the area where the active material particles are in contact with each other.

Alternatively, a particle-like material can be used for the conductive additive. A typical example of the particle-like material is carbon black, such as acetylene black, whose diameter is 3 nm to 500 nm, inclusive.

A flake-like, needle-like, or fiber-like conductive additive has a function of binding the active material particles and inhibits deterioration of a battery. Such a conductive additive also functions as a structure body for maintaining the shape of the active material layer 202 or cushioning. Thus, separation between the current collector and the active material particles is less likely to occur even when a secondary battery is changed in its form by being bent or by repeated expansion and contraction of the active material particles. Although carbon black such as acetylene black may be used instead of the above material, VGCF (registered trademark) is preferably used because the strength for keeping the shape of the active material layer 202 can be increased. When the strength for keeping the shape of the active material layer 202 is high, deterioration of the secondary battery caused by changes in its form (e.g., bending) can be prevented.

The above-described active material layer 202 preferably contains, with respect to the total weight of the active material layer 202, the active material at greater than or equal to 80 wt % and less than or equal to 95 wt %, the graphene at greater than or equal to 0.1 wt % and less than or equal to 8 wt %, and the binder at greater than or equal to 1 wt % and less than or equal to 10 wt %. In the case where the active material layer 202 contains the second conductive additive, the sum of the weight ratio of the graphene and the weight ratio of the second conductive additive is preferably greater than or equal to 0.1 wt % and less than or equal to 8 wt % with respect to the total weight of the active material layer 202.

As described in this embodiment, the region 133 (graphene oxide or the like) which is a covering film is formed to cover the surface of the active material particle (the region 131 and the region 132), and one of the regions 133 is in contact with another region 133, whereby a storage battery electrode including a high-density active material layer can be provided.

Although the case where graphene is used for the storage battery electrode is described in this embodiment, depending on circumstances or conditions, graphene or graphene oxide can be used for any of the following components: an electrode for a supercapacitor that has extremely high capacitance; an oxygen-reduction electrode catalyst; a material of a dispersion liquid with lower friction than a lubricant; a transparent electrode for a display device or a solar battery; a gas-barrier material; a lightweight polymer material with high mechanical strength; a material for a sensitive nanosensor for sensing uranium or plutonium contained in radiation-tainted water; and a material used for removing a radioactive material. Depending on circumstances or conditions, for example, graphene is not necessarily used for the storage battery electrode, for example.

This embodiment can be implemented in appropriate combination with any of the other embodiments and example.

Embodiment 2

In this embodiment, a method for manufacturing the electrode 200 including the active material layer 202 in FIG. 2 by using the active material, the conductive additive, and the binder that are described in Embodiment 1 as examples will be described with reference to FIG. 1.

First, a method for forming the "particle containing the lithium-manganese complex oxide" will be described. In this embodiment, the lithium-manganese complex oxide is synthesized first. Then, a coating layer is formed on the lithium-manganese complex oxide, so that a particle including a first region, a second region, and a third region is obtained. As row materials of the lithium-manganese complex oxide, the materials described in Embodiment 1 can be used. In this embodiment, $MnCO_3$ (manganese compound), $Li_2CO_3$ (lithium compound), and NiO are used as starting materials.

First, $Li_2CO_3$, $MnCO_3$, and NiO are each weighed as a starting material as shown in Step S11 in FIG. 1.

In the case where $Li_2CO_3$, $MnCO_3$, and NiO are used as starting materials at a ratio for weighing (molar ratio) of 1:0.7:0.3, for example, a lithium-manganese complex oxide $Li_2Mn_{0.7}Ni_{0.3}O_3$ is formed as a final product. In this case, the atomic ratio of Li to (Mn+Ni) in the lithium-manganese complex oxide is 2:1.

The ratio for weighing (molar ratio) of the starting materials is adjusted so that the atomic ratio of Li to (Mn+Ni) in the lithium-manganese complex oxide is slightly different from 2:1.

In this embodiment, the starting materials are weighed so that the ratio for weighing (molar ratio) of $Li_2CO_3$ to $MnCO_3$ and NiO becomes 0.84:0.8062:0.318.

Next, $Li_2CO_3$, $MnCO_3$, and NiO are mixed as shown in Step S12 in FIG. 1. A method for mixing the starting materials is not particularly limited. A known crusher or a known mill such as ball mill, a bead mill, a jet mill, or a roller mill can be used. A crushing and grinding method may be a dry method or a wet method. There is no particular limitation on a solvent that is used in a wet method, and water, alcohol, or acetone can be used as the solvent, for example.

When the starting materials are mixed by a wet method, heat treatment shown in Step S13 in FIG. 1 for evaporating a solvent contained in the mixed starting materials is performed. The heat treatment is performed at higher than or equal to 50° C. and lower than or equal to 150° C. The solvent contained in the mixed starting materials is evaporated by the heat treatment, whereby a mixed material is obtained.

Then, the mixed material is put in a crucible and firing shown in Step S14 in FIG. 1 is performed at higher than or equal to 800° C. and lower than or equal to 1000° C. The firing is performed for longer than or equal to 5 hours and shorter than or equal to 20 hours in an air gas (dry air) at a flow rate of 10 L/min, for example. The firing atmosphere may be an air atmosphere or an atmosphere containing an oxygen gas. Owing to the firing of the mixed material, a fired object (lithium-manganese complex oxide) is formed.

The lithium-manganese complex oxide which is synthesized by firing and in which a plurality of primary particles are sintered is in a state where the plurality of primary particles are sintered and a large secondary particle is formed. Therefore, crushing treatment shown in Step S15 in FIG. 1 is performed on the lithium-manganese complex oxide in which the plurality of primary particles are sintered. By performing the crushing treatment on the fired object, the fired object is crushed into the primary particles or powder as small as the primary particles. The crushing treatment in this specification and the like includes an operation of grinding a sintered object. Note that grinding means further crushing of the primary particles. As in the case of mixing the starting materials, a known crusher or a known mill such as a ball mill or a bead mill can be used for the crushing treatment. A crushing and grinding method may be a dry method or a wet method. There is no particular limitation on a solvent that is used in a wet method, and water, alcohol, or acetone can be used as the solvent, for example.

The size of the particle subjected to crushing and grinding can be evaluated by measuring the specific surface area of the particle, for example. By increasing the specific surface area of the particle containing the lithium-manganese complex oxide, for example, the area of contact between the particle and an electrolyte solution can be increased in the case of manufacturing a storage battery including a positive electrode in which the particle containing the lithium-manganese complex oxide is used. The increase in their contact area can increase the reaction rate of the storage battery and increase the output characteristics, for example.

It is preferable to perform the crushing treatment because the specific surface area of the particle is increased in some cases. The specific surface area of the particle containing the lithium-manganese complex oxide is preferably greater than or equal to 0.1 $m^2/g$, for example. If the specific surface area of the particle is too much increased, the amount of binders in the electrode containing the particle with respect to the specific surface area becomes insufficient, and accordingly, the strength of the electrode is reduced in some cases. When the amount of binders is increased in this case, the capacity of the electrode per unit weight and unit volume is reduced in some cases. Therefore, the specific surface area of the particle containing the lithium-manganese complex oxide is preferably greater than or equal to 1 $m^2/g$ and less than or equal to 50 $m^2/g$, more preferably greater than or equal to 5 $m^2/g$ and less than or equal to 30 $m^2/g$.

In this embodiment, the crushing treatment of the lithium-manganese complex oxide in which primary particles are sintered is performed with a bead mill by a wet method using acetone.

When the crushing treatment is performed by a wet method, heat treatment for evaporating a solvent is performed after the crushing treatment. The heat treatment may be performed in a manner similar to that of the heat treatment in Step S13. After that, vacuum drying is performed, whereby powdery lithium-manganese complex oxide is obtained.

Next, heat treatment is performed. The heat treatment shown in Step S16 in FIG. 1 is performed in the following manner: the lithium-manganese complex oxides subjected to the crushing treatment are put in a crucible and heated at higher than or equal to 300° C. and lower than or equal to 1000° C., preferably higher than or equal to 600° C. and lower than or equal to 900° C. The heat treatment is performed for longer than or equal to 5 hours and shorter than or equal to 20 hours in an air gas (dry air) at a flow rate of 10 L/min, for example. The atmosphere may be an air atmosphere or an atmosphere containing an oxygen gas.

Through the above steps, the lithium-manganese complex oxide represented by the composition formula $Li_aMn_bM_cO_d$ can be formed. In this embodiment, the raw materials are weighed so that the ratio for weighing (molar ratio) of $Li_2CO_3$ to $MnCO_3$ and NiO becomes 0.84:0.8062:0.318, whereby a lithium-manganese complex oxide represented by a composition formula $Li_{1.68}Mn_{0.8062}M_{0.318}O_3$ can be formed.

The crystallinity of the lithium-manganese complex oxide subjected to the crushing treatment shown in Step S15 might be disordered by the impact of the crushing treatment. In addition, oxygen vacancies might be formed in the lithium-manganese complex oxide. Thus, heat treatment is preferably performed again on the powdery lithium-manganese complex oxide subjected to the vacuum drying.

The heat treatment performed on the lithium-manganese complex oxides subjected to the crushing treatment can repair oxygen vacancies and compensate the crystal disorder caused by the crushing treatment. Note that another crushing treatment may be performed on the powdery lithium-manganese complex oxide subjected to the heat treatment, in which case the crushing treatment can be performed in a manner similar to that of the crushing treatment in Step S15 in FIG. 1.

Here, a lithium-manganese complex oxide was formed by Step S11 through Step S16 shown in FIG. 1 using raw materials of $Li_2CO_3$:$MnCO_3$:NiO=0.84:0.8062:0.318, and the temperature stability of the lithium-manganese complex oxide was evaluated. Specifically, the evaluation was performed by differential scanning calorimetry (DSC). Heat generation was observed at 262.2° C. At temperatures lower than 262.2° C., the lithium-manganese complex oxide was stable in the DSC evaluation. Thus, it is shown that the lithium-manganese complex oxide is stable even at high temperatures, e.g., 260° C. or lower.

The atomic ratio of Li to (Mn+Ni) in the lithium-manganese complex oxide described in this embodiment is adjusted to be slightly different from 2:1. Thus, the electrode containing such a lithium-manganese complex oxide can increase the voltage and the discharge capacity as compared with that containing a lithium-manganese complex oxide whose atomic ratio of Li to (Mn+Ni) is 2:1.

Through the above steps, the lithium-manganese complex oxide in the form of particles can be obtained. Here, the lithium-manganese complex oxide preferably includes the first region and the second region. The second region is in contact with at least part of an outside of the first region. Here, the term "outside" refers to the side closer to a surface of a particle.

The first region and the second region contain lithium and oxygen. At least one of the first region and the second region contains manganese. At least one of the first region and the second region contains the element M. Here, the element M is preferably silicon, phosphorus, or a metal element other than lithium and manganese, more preferably Si, P, or a metal element selected from Ni, Ga, Fe, Mo, In, Nb, Nd, Co, Sm, Mg, Al, Ti, Cu, and Zn, still more preferably nickel.

Next, the coating layer (third region) is formed on the obtained lithium-manganese complex oxide. The coating layer preferably contains carbon. Since carbon has high conductivity, the particle coated with carbon in the electrode of the storage battery can reduce the resistance of the electrode, for example. The coating layer may contain graphene oxide or graphene oxide subjected to reduction.

The coating layer may contain a metal compound. Examples of the metal include cobalt, aluminum, nickel, iron, manganese, titanium, zinc, lithium, and carbon. Examples of the metal compound include an oxide of the metal and a fluoride of the metal.

In this embodiment, a layer containing carbon is provided on at least part of the lithium-manganese complex oxide as the coating layer. It is preferred to use graphene as the layer containing carbon. Graphene has excellent electrical characteristics of high conductivity and excellent physical properties of high flexibility and high mechanical strength.

Note that graphene in this specification includes single-layer graphene or multilayer graphene including two to one hundred layers. Single-layer graphene refers to a one-atom-thick sheet of carbon molecules having π bonds. Graphene oxide refers to a compound formed by oxidation of such graphene. When graphene oxide is reduced to give graphene, oxygen contained in the graphene oxide is not entirely released and part of the oxygen remains in graphene. When graphene contains oxygen, the proportion of oxygen in the graphene, which is measured by X-ray photoelectron spectroscopy (XPS), is higher than or equal to 2% and lower than or equal to 20%, preferably higher than or equal to 3% and lower than or equal to 15%.

The thickness of the layer containing carbon is preferably greater than or equal to 0.4 nm and less than or equal to 40 nm.

Next, a method for providing the layer containing carbon on the lithium-manganese complex oxide will be described. In this embodiment, reduced graphene oxide (abbreviated to RGO) obtained by reducing graphene oxide (abbreviated to GO) is used as the layer containing carbon.

Various synthesis methods such as a Hummers method, a modified Hummers method, and oxidation of graphite can be used to form graphene oxide.

For example, in a Hummers method, graphite such as flake graphite is oxidized to give graphite oxide. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. It is preferable that the flake size be as large as possible to cover surfaces of the lithium-manganese complex oxides with ease.

First, graphene oxide and water are put in a mixer to form a dispersion solution of graphene oxide. In the following description, this dispersion solution of graphene oxide is referred to as a graphene oxide aqueous solution. At this time, the concentration of the graphene oxide is preferably higher than or equal to 0.5 wt % and lower than or equal to 5 wt %. Graphene oxide at lower than 0.5 wt % is insufficient to cover the surfaces of the lithium-manganese complex oxides, whereas graphene oxide at higher than 5 wt % causes an increase in the volume and weight of the electrode.

The lithium-manganese complex oxide exhibits basicity in some cases. Therefore, when a binder, a conductive additive, and a solvent used in the later steps of manufacturing an electrode are mixed with the lithium-manganese complex oxide to form a slurry or a paste, gelation of the binder is accelerated by the basic lithium-manganese complex oxide and the viscosity of the slurry or the paste extremely increases, which makes it difficult to manufacture an electrode in some cases.

In contrast, the graphene oxide aqueous solution exhibits acidity. Thus, in Step S17, when the lithium-manganese complex oxide is added to the graphene oxide aqueous solution, an acid-base reaction is caused, and the basicity of the lithium-manganese complex oxide is lowered.

As a result, even when the binder and the conductive additive are added and mixed in a later step, gelation of the slurry or the paste can be suppressed. Addition of the lithium-manganese complex oxide to the graphene oxide aqueous solution in Step S17 is effective in stably manufacturing an electrode because it widens margins in the later steps of mixing with the binder and the conductive additive and applying the mixture on the current collector.

Next, the lithium-manganese complex oxides are put in the dispersion solution and kneading is performed as shown in Step S17 in FIG. 1. Note that kneading means mixing something until it has a high viscosity. The kneading can separate aggregation of lithium-manganese complex oxide powder; thus, the graphene oxide and the lithium-manganese complex oxides can be uniformly dispersed.

Then, the mixture of the graphene oxide and the lithium-manganese complex oxides is dried under a reduced pressure in a bell jar and then is ground in a mortar, so that the lithium-manganese complex oxides coated with graphene oxide are obtained.

Subsequently, reduction treatment is performed on the graphene oxide covering the surfaces of the lithium-manganese complex oxides as shown in Step S18 in FIG. 1. The reduction treatment of the graphene oxide may be performed by heat treatment or by causing a reaction in a solvent containing a reducing agent. In this embodiment, the graphene oxide is reacted in a solvent containing a reducing agent.

When the graphene oxide is reacted in the solvent containing the reducing agent, the graphene oxide covering the surfaces of the lithium-manganese complex oxides is reduced to give graphene. Note that oxygen in graphene oxide is not necessarily entirely released and may remain partly in the graphene. The proportion of oxygen in the graphene, which is measured by XPS, is higher than or equal to 2 atomic % and lower than or equal to 20 atomic %, preferably higher than or equal to 3 atomic % and lower than or equal to 15 atomic %. This reduction treatment is preferably performed at temperatures of room temperature to 150° C., more preferably at temperatures of room temperature to 80° C. The reduction treatment with heating can promote the reduction reaction. The reduction time of the graphene oxide can be longer than or equal to 3 minutes and shorter than or equal to 10 hours.

Examples of the reducing agent include ascorbic acid, hydrazine, dimethyl hydrazine, hydroquinone, sodium tetrahydroborate ($NaBH_4$), lithium aluminum hydride ($LiAlH_4$), N,N-diethylhydroxylamine, and a derivative thereof. For example, ascorbic acid and hydroquinone are preferable to hydrazine and sodium tetrahydroborate in that they are safe owing to low reducing ability and utilized industrially with ease.

A polar solvent can be used as the solvent. Any material can be used for the solvent as long as it can dissolve the reducing agent. Examples of the material of the solvent include water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, glycerin, and a mixed solution of any two or more of the above.

As the reducing solution containing a reducing agent and a solvent, a mixed solution of ethanol and ascorbic acid, or a mixed solution of water, ascorbic acid, and lithium hydroxide can be used. In this embodiment, a reducing solution containing ascorbic acid, water, and lithium hydroxide is used.

When the lithium-manganese complex oxide coated with the graphene oxide is reacted in the reducing solution, the protons of ascorbic acid are added to the graphene oxide and then $H_2O$ is released, whereby the graphene oxide is reduced.

After the reduction treatment, collection of powder is performed as shown in Step S19 in FIG. 1. In this step, the reducing solution is filtrated. A substance obtained in this step is referred to as a substance A. The filtration can be suction filtration or the like. Alternatively, the substance A and a liquid may be separated from each other by centrifugation.

Next, the obtained substance A is washed. The washing is preferably performed using a solution given as the solvent contained in the reducing solution. The solution may be the same as or different from the solvent contained in the reducing solution.

Next, drying is performed. The drying step is performed, for example, at a temperature higher than or equal to 50° C. and lower than 500° C., preferably higher than or equal to 120° C. and lower than or equal to 400° C. for 1 hour to 48 hours. The drying allows evaporation or removal of the polar solvent and moisture. The drying step can also facilitate the reduction of graphene oxide. The drying may be performed under a reduced pressure (in vacuum), in a reduction atmosphere, or under an atmospheric pressure. As a gas, air or an inert gas such as nitrogen may be used.

Here, the substance A preferably forms a secondary particle.

In the case where the substance A forms a secondary particle, the average value of the particle diameters of secondary particles is preferably less than or equal to 50 μm, more preferably less than or equal to 30 μm, still more preferably greater than or equal to 1 μm and less than or equal to 20 μm. The particle diameter refers to, for example, a particle diameter measured with a particle size analyzer. The particle diameter may refer to a particle diameter of the secondary particle of the substance A. The particle diameter of the secondary particle can also be obtained by observation of the particle with a microscope, for example, as well as measurement with a particle size analyzer. Alternatively, the particle diameter can be obtained by calculating a diameter of a circle whose area is equal to the area of the cross section of the particle.

Note that another method may be used in which, after the substance A is washed, a solution is formed by dissolving the substance A in a solvent, and the solution is subjected to spray dry treatment and dried, for example. By the spray dry treatment, the substance A forms a secondary particle, for example, so that a particle diameter is changed in some cases.

Heat treatment is preferably performed after the spray dry treatment. For example, the heat treatment is performed at a temperature higher than or equal to 50° C. and lower than 500° C., preferably higher than or equal to 120° C. and lower than or equal to 400° C. for 1 hour to 48 hours. The heat treatment allows evaporation or removal of the polar solvent and moisture. The heat treatment can also facilitate the reduction of graphene oxide. The heat treatment may be performed under a reduced pressure (in vacuum), in a reduction atmosphere, or under an atmospheric pressure. As a gas, air or an inert gas such as nitrogen may be used.

Through the above steps, the graphene oxide is reduced, so that graphene can be formed on the surface of the lithium-manganese complex oxides.

Note that oxygen in the graphene oxide is not necessarily entirely removed and may remain partly in the graphene. The proportion of oxygen in the graphene, which is measured by XPS, is higher than or equal to 2% and lower than or equal to 20%, preferably higher than or equal to 3% and lower than or equal to 15%.

In some cases, the heat treatment after the reduction treatment can increase electrical conductivity of graphene as compared to that before the heat treatment.

By performing the heat treatment after the reduction treatment, the first region to the third region are formed in the "particle containing the lithium-manganese complex oxide", for example, in some cases. The first region to third region in the "particle containing the lithium-manganese complex oxide" may be formed before the heat treatment or in the heat treatment. The thickness, the composition, the crystal structure, and the like of the first region to the third region which are formed, for example, before the formation of the coating layer, after the formation of the coating layer, and after the reduction treatment may be changed in the heat treatment.

Furthermore, by the heat treatment, an element included in the binder reacts with a particle containing the lithium-manganese complex oxide in some cases. For example, in the case where PVdF is used as the binder, fluorine contained in PVdF and one or more of lithium, manganese, and the element M of the particle containing the lithium-manganese complex oxide may form metal fluoride.

An element contained in the coating layer of the lithium-manganese complex oxide, e.g., the layer containing carbon, and fluorine may form a bond. In the case where the coating layer is the layer containing carbon, carbon fluoride may be formed. Here, the coating layer may correspond the third region included in the "particle containing the lithium-manganese complex oxide" or include the third region and part of the lithium-manganese complex oxide. The second region included in the "particle containing the lithium-manganese complex oxide" may include part of the coating layer, for example.

Through the above steps, a particle in which graphene is provided on at least part of a surface of the lithium-manganese complex oxide can be formed.

Graphene has excellent electrical characteristics of high conductivity and excellent physical properties of high flexibility and high mechanical strength. Therefore, the use of the electrode containing the particle in a battery can improve the electrical conductivity of the electrode, for example.

Next, a method for manufacturing the electrode 200 is described.

First, an electrode binder composition is formed. The electrode binder composition can be formed in such a manner that the above-described active material to which a binder, a conductive additive, and the like are added is mixed with a solvent, for example. The electrode binder composition may be in a slurry form or a paste form. As the solvent, for example, water or N-methyl-2-pyrrolidone (NMP) can be used. Water is preferably used in terms of the safety and cost.

The case where the electrode 200 is a positive electrode of a storage battery will be described as an example. Described here is an example where acetylene black is used as a conductive additive, PVdF is used as a binder, and NMP is used as a solvent.

First, the active material, acetylene black, and polyvinylidene fluoride are mixed. Then, NMP is added to the obtained mixture and mixed until a predetermined degree of viscosity is obtained; thus, the electrode binder composition can be formed. In this step, the mixing and the addition of the polar solvent may be repeated more than once. The electrode binder composition may be in a slurry form or a paste form.

Through the above steps, the electrode binder composition in which the active material, the conductive additive, and the binder are uniformly dispersed can be obtained.

Here, an undercoat may be formed over the current collector. Note that the undercoat is a coating layer provided to reduce contact resistance or to improve adhesion between the current collector and the active material layer. Examples of the undercoat include a carbon layer, a metal layer, a layer containing carbon and high molecules, and a layer containing metal and high molecules. Forming the undercoat over the current collector can reduce the contact resistance between the current collector and the active material layer formed later. In addition, the adhesion between the current collector and the active material layer can be increased. In the case of using graphene as the conductive additive, the undercoat is preferably not dissolved by a reducing solution in the process of reducing graphene oxide.

As the undercoat, for example, an aqueous solution in which graphite, acetylene black, and the like are dispersed or the aqueous solution into which high molecules are mixed can be used. Examples of the undercoat include a mixture of graphite and sodium polyacrylate (PAA) and a mixture of AB and PVdF. The compounding ratio of graphite to PAA is preferably in a range of 95:5 to 50:50, and the compounding ratio of AB to PVdF is preferably in a range of 70:30 to 50:50.

Note that if there is no problem with the adhesion between the current collector and the active material layer, the electrode strength, and the contact resistance, it is not necessary to apply the undercoat to the current collector.

Next, slurry is provided on one or both surfaces of the current collector by a coating method such as a doctor blade method.

Next, the slurry formed over the current collector is dried by a method such as ventilation drying or reduced pressure (vacuum) drying to form the active material layer. The drying is preferably performed using a hot wind with a temperature higher than or equal to 50° C. and lower than or equal to 180° C. Through this step, the polar solvent contained in the active material layer is evaporated. There is no particular limitation on the atmosphere.

The active material layer may be pressed by a compression method such as a roll press method or a flat plate press method to increase the density of the active material layer. Further, by applying heat at higher than or equal to 90° C. and lower than or equal to 180° C., preferably lower than or equal to 120° C. when the pressing is performed, the binder (e.g., PVdF) contained in the undercoat or the active material layer is softened to the extent that the characteristics of the electrode is not changed; thus, the adhesion between the current collector and the active material layer can be further increased.

Then, the active material layer is dried. The drying is preferably performed in a reduced pressure (vacuum) atmosphere or a reduction atmosphere. The drying step is preferably performed, for example, at a temperature higher than or equal to 50° C. and lower than or equal to 600° C., more preferably higher than or equal to 120° C. and lower than or equal to 500° C., still more preferably higher than or equal to 200° C. and lower than or equal to 400° C. for 1 hour to 48 hours. The drying allows sufficient evaporation or removal of the polar solvent and moisture in the active material layer.

Here, in the case where an electrode is manufactured using the "particle containing the lithium-manganese complex oxide" and a storage battery is fabricated using the electrode, the first region to the third region included in the "particle containing the lithium-manganese complex oxide" may be formed in any of the formation process of the "particle containing the lithium-manganese complex oxide" and the fabrication process of the storage battery.

The current collector over which the active material layer is formed may be further pressed. Thus, the adhesion between the current collector and the active material layer can be increased. In addition, the density of the active material layer can be increased. Further, by applying heat at higher than or equal to 90° C. and lower than or equal to 180° C., preferably lower than or equal to 120° C. when the pressing is performed, the binder (e.g., PVdF) contained in the undercoat or the active material layer is softened to the extent that the characteristics of the electrode is not changed; thus, the adhesion between the current collector and the active material layer can be further increased.

Lastly, the current collector and the active material layer are stamped out to have a predetermined size, whereby the electrode is formed.

As described in this embodiment, a strongly basic active material is added to an acid graphene oxide aqueous solution to cause an acid-base reaction, whereby the strong basicity of the active material is lowered and gelation of the binder can be prevented. As a result, an electrode with high strength that is hardly damaged by the external impact can be manufactured. Thus, when a storage battery is manufactured by the method for manufacturing an electrode described in this embodiment, cycle characteristics and rate characteristics of the storage battery can be improved. Furthermore, a method for manufacturing a storage battery can be simplified. In addition, a storage battery with high strength, for example, a storage battery hardly damaged by the external impact, can be manufactured.

This embodiment can be implemented in appropriate combination with any of the other embodiments and example.

Embodiment 3

Figure 9A:
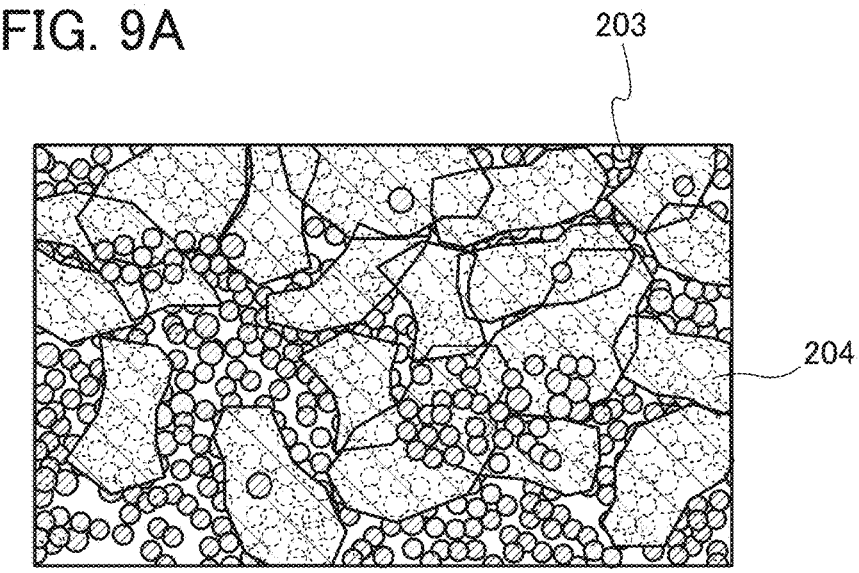
FIGS. 9A and 9B each illustrate a storage battery electrode.

In this embodiment, an example of a storage battery electrode which is different from those in Embodiments 1 and 2 will be described. FIG. 9A is a plan view of an active material layer and FIG. 9B and FIG. 10 are longitudinal cross-sectional views of the active material layer.

The structure, such as the position of the conductive additive with respect to the active material particle, of the storage battery electrode in this embodiment is different from that in Embodiment 1. However, the materials and the like described in Embodiment 1 can be used for other components of the storage battery, such as the positive electrode current collector, the positive electrode active material, the negative electrode current collector, the negative electrode active material, another conductive additive, and the electrolytic solution.

Figure 9B:
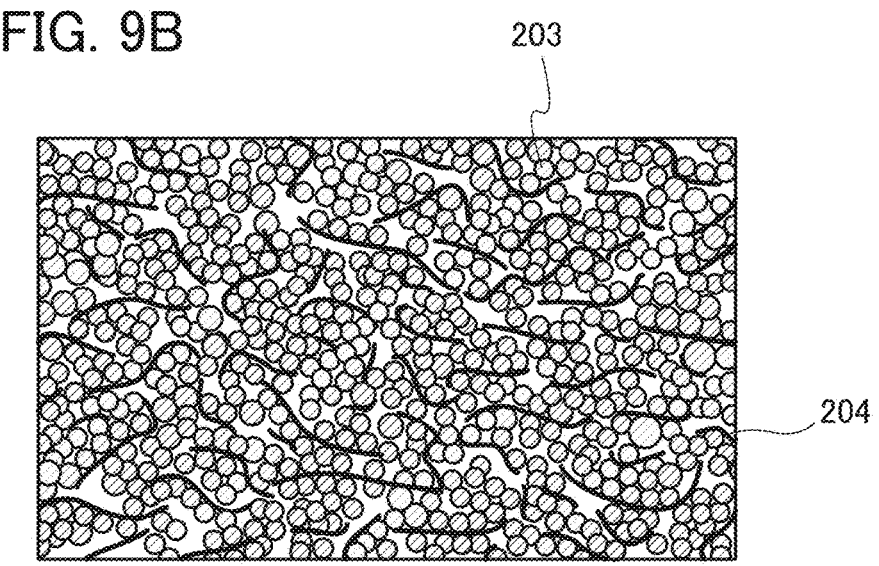
Figure 10:
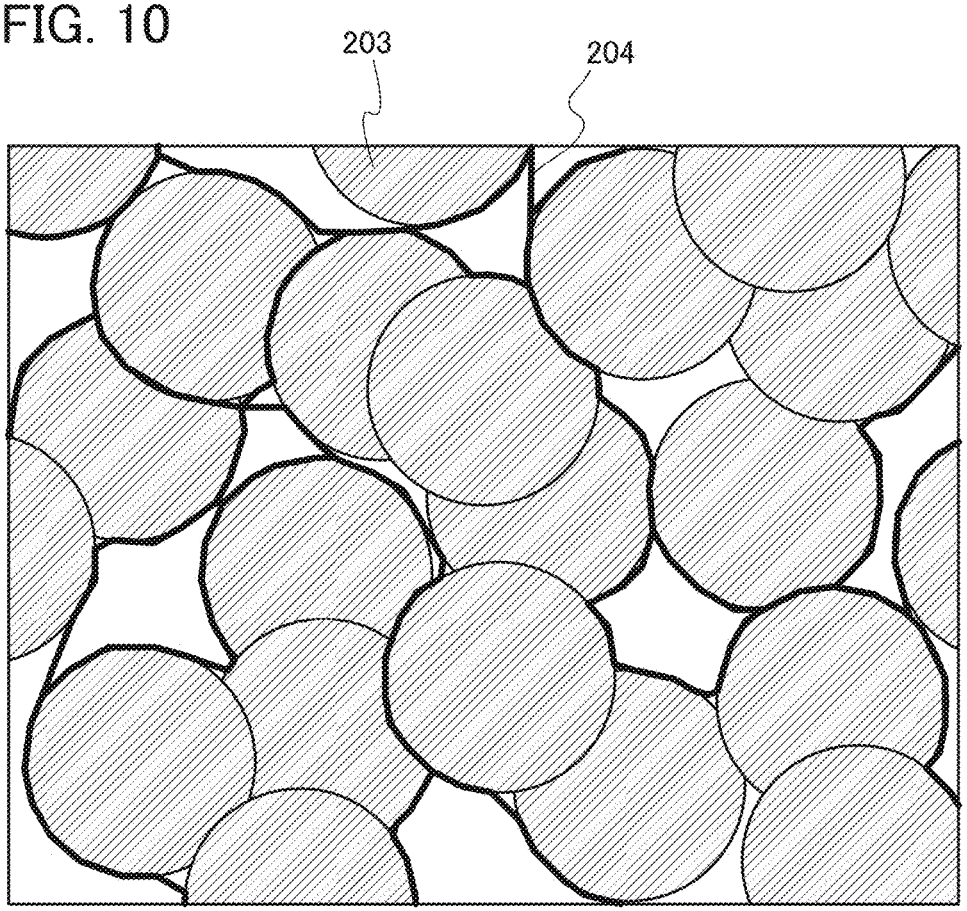
FIG. 10 illustrates a storage battery electrode.

FIGS. 9A and 9B are a schematic top view and a schematic longitudinal cross-sectional view of the active material layer 202. FIG. 10 is a schematic enlarged view of the longitudinal cross section. The active material layer 202 contains graphene 204 as the conductive additive, active material particles 203, and the binder. The active material layer 202 may contain a conductive additive (second conductive additive, not shown) other than graphene.

As in the active material layer 202 illustrated in the top view in FIG. 9A, the active material particles 203 are coated with a plurality of sheets of the graphene 204. Each sheet of the graphene 204 is connected to a plurality of the active material particles 203. In particular, since the graphene 204 is in the form of a sheet, surface contact can be made so as to cover part of the surfaces of the active material particles 203. Unlike a conductive additive in the form of particles, such as acetylene black, which makes point contact with an active material particle, the graphene 204 is capable of surface contact with low contact resistance; accordingly, the electron conductivity of the active material particles 203 and the graphene 204 can be improved without increasing the amount of conductive additive.

Furthermore, surface contact is made between a plurality of sheets of the graphene 204. This is because graphene oxide with extremely high dispersibility in a polar solvent is used for formation of the graphene 204. A solvent is removed by volatilization from a dispersion medium in which graphene oxide is uniformly dispersed, and the graphene oxide is reduced to graphene; hence, the sheets of the graphene 204 remaining in the active material layer 202 partly overlap with each other and are dispersed such that surface contact is made. Accordingly, an electric conduction path is formed.

In the top view of the active material layer 202 in FIG. 9A, the graphene 204 does not necessarily overlap with another graphene on a surface of the active material layer 202; part of the graphene 204 is provided between the active material layers 202. The graphene 204 is an extremely thin film (sheet) made of a single layer or stacked layers of carbon molecules and thus is in contact with part of the surfaces of the active material particles 203 so as to trace these surfaces. A portion of the graphene 204 that is not in contact with the active material particles 203 is warped between the active material particles 203 and crimped or stretched.

The longitudinal section of the active material layer 202 in FIG. 9B shows substantially uniform dispersion of the sheet-like graphene 204 in the active material layer 202. The graphene 204 is schematically shown by a heavy line in FIG. 9B but is actually a thin film having a thickness corresponding to the thickness of a single layer or a multiple layer of carbon molecules. As described using the top view of the active material layer 202, a plurality of sheets of the graphene 204 are formed so as to wrap or coat a plurality of the active material particles 203 and thus are in surface contact with the active material particles 203. Furthermore, a plurality of sheets of the graphene 204 are also in surface contact with each other; consequently, a plurality of sheets of the graphene 204 construct an electric conduction network. FIG. 10 is a schematic enlarged view of FIG. 9B. The graphene 204 coats the surfaces of a plurality of the active material particles 203 so as to cling to the surfaces, and a plurality of sheets of graphene are also in contact with each other; thus, the network is constructed.

As illustrated in FIG. 9A, FIG. 9B, and FIG. 10, a plurality of sheets of the graphene 204 are three-dimensionally dispersed throughout the active material layer 202 and in surface contact with each other, which constructs the three-dimensional electric conduction network. Furthermore, each sheet of the graphene 204 coats and makes surface contact with a plurality of the active material particles 203.

This embodiment can be implemented in appropriate combination with any of the other embodiments and example.

Embodiment 4

In this embodiment, a method for manufacturing the electrode 200 including the active material layer 202 by using the active material, the conductive additive, and the binder that are described in Embodiment 3 as examples will be described with reference to FIG. 6.

First, an active material, graphene oxide, and a dispersion medium are mixed to form a first mixture (Step S101). A second conductive additive may be added to the first mixture. For the active material, the graphene oxide, and the second conductive additive, any of the materials described in Embodiment 1 can be used.

A polar solvent can be used as the dispersion medium. For example, methanol, ethanol, acetone, tetrahydrofuran (THF), dimethylformamide (DMF), N-methyl-2-pyrrolidone (NMP), dimethyl sulfoxide (DMSO), or a mixed solution of any two or more of the above can be used. It is particularly preferable to use NMP because graphene oxide can be well dispersed therein.

Next, the mixture is kneaded, so that the cohesion of the graphene oxide and the active material particles can be weakened. Since oxygen in a functional group of the graphene oxide is negatively charged in the polar solvent, different sheets of graphene oxide are unlikely to be aggregated. Hence, the active material particles and the graphene oxide can be further uniformly dispersed.

After that, a reducing agent is added to the first mixture and they are mixed to reduce the graphene oxide, whereby a second mixture is formed (Step S102). It is preferable that the reducing agent dissolved in a small amount of a solvent be added to the first mixture, which leads to easy mixing. Through this step, the graphene oxide can be reduced to be graphene. Note that it is possible that oxygen in the graphene oxide is not entirely released and partly remains in the graphene.

For the reducing agent, any of the materials described in Embodiment 1 can be used. As the solvent, a low-boiling solvent in which the reducing agent is easily dissolved, such as water, methanol, or ethanol can be used.

The mixture to which the reducing agent is added may be heated at a temperature higher than or equal to 30° C. and lower than or equal to 200° C., preferably higher than or equal to 50° C. and lower than or equal to 100° C. The heating can promote the reduction reaction of the graphene oxide. There is no particular limitation on the atmosphere.

The graphene oxide can be reduced not by addition of the reducing agent, but by heating of the mixture containing the graphene oxide (such a method is also referred to as thermal reduction). Note that the heating needs to be performed at high temperatures to reduce the graphene oxide sufficiently by thermal reduction. However, the limitation such as heat resistant temperature of a material or an apparatus used for manufacturing the electrode might inhibit heating of the graphene oxide to a temperature at which the graphene oxide is sufficiently reduced, which results in insufficient reduction of the graphene oxide. In contrast, one embodiment of the present invention does not require heating at high temperatures; the graphene oxide can be reduced by addition of the reducing agent. Thus, Step S102 can be considered to increase the reduction efficiency of the graphene oxide under mild conditions.

The proportion of the weight of the reducing agent to the weight of the graphene oxide contained in the first mixture is preferably set higher than or equal to 5 wt % and lower than or equal to 500 wt %. The weight of the reducing agent may be changed depending on the degree of oxidation of the graphene oxide used in Step S101.

The use of a high-density active material might increase the density of the active material layer 202. Examples of the high-density active material include a lithium-manganese complex oxide represented by the composition formula $Li_xMn_yM_zO_w$, $LiCoO_2$, and a NiMnCo-based material such as $LiNi_{1/3}Mn_{1/3}Co_{1/3}O_2$. In the case where the graphene oxide is reduced after the active material layer 202 is formed, the graphene oxide cannot be reduced sufficiently in some cases. This is probably because the active material layer 202 hardly contains air gaps and the reducing agent does not sufficiently penetrate deeply into the active material layer 202.

As shown in Step S102, in one embodiment of the present invention, the reducing agent is added to the first mixture, which is the predecessor of the active material layer, so that the graphene oxide is reduced. When the reducing agent is added to the first mixture, the reducing agent is widely dispersed throughout the mixture and the graphene oxide contained in the second mixture can be reduced with high efficiency. Accordingly, the active material layer 202 in which the graphene oxide is reduced with high efficiency can be formed in Step S104 performed later.

When a basic material is used as the active material, the second mixture might be basic. Examples of the basic active material include a lithium-manganese complex oxide represented by the composition formula $Li_xMn_yM_zO_w$. In that case, for example, when the binder containing PVdF is added to the second mixture in the subsequent Step S105, PVdF might be gelled and uniform mixing of a third mixture might be difficult.

However, in Step S101, when the strongly basic active material is added to the acid graphene oxide aqueous solution and an acid-base reaction occurs, the second mixture can be prevented from becoming strongly basic. In that case, PVdF can be prevented from being gelled in Step S105; thus, mixing of the third mixture can be performed uniformly. Since the active material layer in which the binder is uniformly dispersed can be formed as a result of the above, an electrode with a uniform thickness can be manufactured. Furthermore, an electrode with high strength, for example, an electrode hardly damaged by the external impact, can be manufactured.

As described above, in one embodiment of the present invention, by causing an acid-base reaction with the use of the graphene oxide aqueous solution, a basic active material and a binder that is gelled in a strongly basic mixture can be used in combination to manufacture an electrode with a uniform thickness or an electrode with high strength. That is, one embodiment of the present invention is preferable because the range of choices for materials of an active material and a binder and for combinations of the materials can be wide.

The second mixture may be dried at a temperature higher than or equal to 20° C. and lower than or equal to 80° C. in a reduced pressure atmosphere for 5 minutes or more and 10 hours or less to remove the solvent added when the reducing agent is added.

Next, the basicity of the second mixture is measured. For example, the second mixture and pure water or ultrapure water (preferably with a pH of 7) are mixed at a predetermined ratio, and the pH of the aqueous solution is measured (Step S103). For example, the second mixture and the pure water are mixed at a weight ratio of 1:10, and the hydrogen-ion concentration of the aqueous solution obtained by filtration of the mixed solution may be measured. Then, the quality of the second mixture is checked on the basis of the measured hydrogen-ion concentration (or pH) (Step S104).

For example, in the case where the pH is greater than or equal to 7.0 and less than 11.1, the quality may be determined to be within a predetermined range. Alternatively, when the pH is greater than or equal to 10 and less than or equal to 11, the quality may be determined to be within a predetermined range. When the pH is within the predetermined range, next treatment is performed; when the pH is not within the predetermined range, the second mixture is discarded. Through this step, generation of defects due to gelation of the binder in the following steps can be prevented.

Next, the binder is added to the second mixture and kneading is performed, so that the third mixture (paste) is formed (Step S105). For the binder, any of the materials described in Embodiment 1 can be used. Since it is apparent that the second mixture hardly causes gelation of the binder according to the result in Step S104, the probability of generation of defects in this step is extremely low.

Next, the third mixture is applied on the current collector and dried (Step S106). The drying step is performed by heating at 20° C. or higher and 170° C. or lower for 1 minute or longer and 10 hours or shorter, so that the dispersion medium is evaporated. There is no particular limitation on the atmosphere. Thus, the active material layer is formed.

Another method for manufacturing the electrode 200 including the active material layer 202 is described with reference to FIG. 7. First, an active material, graphene oxide, and a dispersion medium are mixed to form a first mixture (Step S111). Next, a reducing agent is added to the first mixture (Step S112). Then, the basicity of the first mixture to which the reducing agent is added is measured (Step S113). Whether the first mixture to which the reducing agent is added is used in the next step or discarded is determined in accordance with the measurement result (Step S114).

When the basicity of the first mixture to which the reducing agent is added is within the predetermined range, the first mixture and a binder are mixed and kneaded, so that a fourth mixture is formed. Then, the graphene oxide in the fourth mixture is reduced (Step S115). Next, the fourth mixture is applied on a current collector and dried (Step S116). Thus, an active material layer is formed. Note that the step of reducing the graphene oxide is not necessarily performed before applying the fourth mixture on the current collector as in Step S115 and may be performed after applying the fourth mixture on the current collector.

Another method for manufacturing the electrode 200 including the active material layer 202 is described with reference to FIG. 8. First, an active material, graphene oxide, and a dispersion medium are mixed to form a first mixture (Step S121). Next, a reducing agent is added to the first mixture (Step S122). Then, the basicity of the first mixture to which the reducing agent is added is measured (Step S123). Whether the first mixture to which the reducing agent is added is used in the next step or graphene oxygen is further added to the first mixture is determined in accordance with the measurement result (Step S124).

When the basicity of the first mixture is not within the predetermined range, graphene oxide is further added (Step S125). The first mixture through Step S125 is subjected to measurement of its basicity again in Step S123. Note that the maximum number of times for adding graphene oxide in Step S125 may be set so that endless loop of Steps S123 to S125 is prevented.

When the basicity of the first mixture is determined to be within the predetermined range in Step S123, the first mixture, a reducing agent, and a binder are mixed and kneaded, so that a fifth mixture is formed (Step S126). Then, the fifth mixture is applied on a current collector and dried, and the graphene oxide in the fifth mixture is reduced (Step S127). Thus, an active material layer is formed. Note that the step of reducing the graphene oxide is not necessarily performed after applying the fifth mixture on the current collector as in Step S127 and may be performed before applying the fifth mixture on the current collector.

Through the above steps, the electrode 200 including the active material layer 202 in which the graphene 204 is uniformly dispersed in the active material particles 203 can be manufactured. Note that a step of applying pressure to the electrode 200 may be performed after the drying step.

The lithium-manganese complex oxide used for the active material layer in this embodiment exhibits strong basicity. It is observed that the basicity of a lithium-manganese complex oxide varies among lots although the lithium-manganese complex oxide is formed under the same conditions. Since a lithium-manganese complex oxide is difficult to dissolve in water, the measurement of its basicity needs to be conducted under special conditions. For example, the basicity can be measured in the following manner: the lithium-manganese complex oxide and pure water are mixed at a weight ratio of 1:10, and the hydrogen-ion concentration of a supernatant liquid (or an aqueous solution from which a solid is removed) of the mixture is measured. For example, the hydrogen-ion concentration measured in this manner varies within a pH range of 11.1 to 12.5, inclusive.

The same can apply to graphene oxide. The acidity of graphene oxide is also known to vary among lots. In general, graphene oxide is a substance which does not have a specific structure formula; a variety of functional groups such as an epoxy group, a carbonyl group, a carboxyl group, and a hydroxyl group are bonded to graphene. Thus, the molecular weight and the structure of graphene oxide are not strictly specified. Accordingly, even when graphene oxides are formed under the same conditions, the acidities thereof are not always strictly the same.

Since graphene oxide is difficult to dissolve in water, the measurement of its acidity needs to be conducted under special conditions. For example, the acidity can be measured in the following manner: graphene oxide and pure water are mixed at a weight ratio of 1:10, and the hydrogen-ion concentration of a supernatant liquid (or an aqueous solution from which a solid is removed) of the mixture is measured. For example, the hydrogen-ion concentration measured in this manner varies within a range of 0.5 to 2.0, inclusive, typically within a range of 0.9 to 1.2, inclusive.

With such variations, even when a given amount of graphene oxide is added to a given amount of a lithium-manganese complex oxide, whether gelation of a binder can be prevented or not is uncertain, and accordingly defects are generated with quite a high probability. In contrast, as described above, when the basicity of a mixture containing a lithium-manganese complex oxide is known before mixing with a binder, whether mixing with the binder is possible or not can be determined in advance; thus, defects can be prevented from being generated.

As described in this embodiment, when a reducing agent is added to a mixture containing an active material and graphene oxide and heating is performed in a later step, the graphene oxide can be reduced under mild conditions. In addition, the reduction efficiency of the graphene oxide can be increased. Furthermore, gelation of the binder can be suppressed, so that an electrode with uniform thickness can be formed. In addition, an electrode with high strength that is hardly damaged by the external impact can be manufactured. Accordingly, a storage battery whose electrode is manufactured by the method described in this embodiment can have high strength, for example, the storage battery can be hardly damaged by the external impact.

This embodiment can be implemented in appropriate combination with any of the other embodiments and example.

Example

One embodiment of the present invention is specifically described below with an example. This example shows results of formation of a positive electrode by the method described in Embodiment 2. Note that the present invention is not limited only to Example below.

A lithium-manganese complex oxide was synthesized as a positive electrode active material. Starting materials $Li_2CO_3$, $MnCO_3$, and NiO were weighed so that the molar ratio of Li to Mn and Ni was 1.68:0.8062:0.318.

Next, ethanol was added to the weighed NiO powder. The mixture was ground in a ball mill at a peripheral speed of 12 m/s for 0.5 hours. Then, the weighed $Li_2CO_3$ and $MnCO_3$ were added, and grinding was performed at a peripheral speed of 10 m/s for 0.5 hours.

The ethanol in the mixed material was volatized. After that, the mixed material was put into a crucible and heating was performed at 1000° C. for 10 hours in the air at a flow rate of 10 L/min. Thus, a material was synthesized.

Subsequently, crushing treatment was performed to separate the sintered particles. The crushing treatment was performed in a ball mill at a peripheral speed of 12 m/s for 10 hours after ethanol was added.

After the crushing treatment, heating was performed to volatilize the ethanol, so that a lithium-manganese complex oxide containing nickel, which was Sample 1, was obtained.

In addition, graphene oxide (GO) which is a conductive additive was mixed to Sample 1 to coat particles of the lithium-manganese complex oxide containing nickel so that the ratio of GO to the lithium-manganese complex oxide containing nickel was 2 weight %. Thirty-minute mixing was performed twice at 80 rpm. Drying was performed at 70° C. for 12 hours after the mixing. The resulting mixture was referred to as Sample 2.

Then, for reduction of GO, L-ascorbic acid which was dissolved in a small amount of water was added to Sample 2, mixing was performed, and heating was performed at 60° C., so that the graphene oxide was reduced. The resulting mixture was referred to as Sample 3.

Pure water and Sample 1 were mixed at a weight ratio of 10:1 for measurement of the hydrogen-ion concentration of Sample 1. This mixture was subjected to filtration to remove a solid. The obtained filtrate was referred to as Solution A. The pH of Solution A was 11.6.

Pure water and Sample 2 were mixed at a weight ratio of 10:1 for measurement of the hydrogen-ion concentration of Sample 2. This mixture was subjected to filtration to remove a solid. The obtained filtrate was referred to as Solution B. The pH of Solution B was 11.0.

Pure water and Sample 3 were mixed at a weight ratio of 10:1 for measurement of the hydrogen-ion concentration of Sample 3. This mixture was subjected to filtration to remove a solid. The obtained filtrate was referred to as Solution C. The pH of Solution C was 10.8.

Table 1 shows the hydrogen-ion concentration of Solutions A, B, and C and fluidity of slurries formed by addition of acetylene black (AB) as a conductive additive at 5 weight % and PVdF as a binder at 5 weight % to Samples 1, 2, and 3. In Table 1, "NG" means that gelation of the binder easily occurs, and "OK" means that gelation hardly occurs. Solution A had a high pH of 11.6 and caused gelation when PVdF which tends to be adversely affected under a basic environment was used as a binder. In contrast, Solutions B and C had a pH of less than 11.1 and did not cause gelation of PVdF.

TABLE 1

|  | Hydrogen-ion concentration (pH) | Fluidity of slurry |
| --- | --- | --- |
| Sample 1 | 11.6 | NG |
| Sample 2 | 11.0 | OK |
| Sample 3 | 10.8 | OK |

Lastly, an electrode was manufactured using the obtained Sample 3. Acetylene black (AB) was used as a conductive additive, and PVdF was used as a binder. First, PVdF and AB were mixed with N-methyl-2-pyrrolidone (NMP) which was a polar solvent. Five-minute mixing was performed at 2000 rpm. After that, Sample 3 was added and five-minute mixing was performed at 2000 rpm five times. After that, NMP was added and ten-minute mixing was performed at 2000 rpm twice. Through the above steps, a slurry electrode binder composition was obtained. The compounding ratio of Sample 3 to AB and PVdF in the electrode binder composition was 90:5:5 (weight ratio).

The basicity of the lithium-manganese complex oxide containing nickel was reduced by addition of graphene oxide. As a result, the fluidity of the slurry was able to be improved without a neutralization step.

This application is based on Japanese Patent Application serial no. 2015-187733 filed with Japan Patent Office on Sep. 25, 2015, the entire contents of which are hereby incorporated by reference.

What is claimed is:

1. A method for manufacturing a slurry for a storage battery electrode comprising the steps of:
   forming an active material;
   forming a mixture of an oxidized derivative of a first conductive additive and the active material;
   measuring a basicity using a part of the mixture; and
   forming the slurry using another part of the mixture and a binder only in the case where the measured basicity is a pH range of greater than or equal to 7.0 and less than 11.1.

2. The method for manufacturing a slurry for a storage battery electrode according to claim 1,
   wherein the active material is in a form of powder, and
   wherein an aqueous solution with a pH of greater than or equal to 11.1 and less than or equal to 12.5 is obtained in the case where the active material and water with a pH of 7 are mixed at a weight ratio of 1:10.

3. The method for manufacturing a slurry for a storage battery electrode according to claim 1, wherein in the step of measuring the basicity, the part of the mixture is dried to be powdered, and a hydrogen-ion concentration of an aqueous solution obtained by mixing the powdered mixture and water with a pH of 7 at a ratio of 1:10 is measured.

4. The method for manufacturing a slurry for a storage battery electrode according to claim 1,
   wherein the predetermined range is a pH range of greater than or equal to 10 and less than or equal to 11.

5. The method for manufacturing a slurry for a storage battery electrode according to claim 1, further comprising filtrating the slurry.

6. The method for manufacturing a slurry for a storage battery electrode according to claim 1, further comprising reducing the slurry.

7. The method for manufacturing a slurry for a storage battery electrode according to claim 1, wherein the oxidized derivative is graphene oxide.

8. The method for manufacturing a slurry for a storage battery electrode according to claim 7, wherein the graphene oxide and water with a pH of 7 are mixed at a weight ratio of 1:10 to give an aqueous solution with a pH of greater than or equal to 0.9 and less than or equal to 1.2.

9. The method for manufacturing a slurry for a storage battery electrode according to claim 1, wherein the binder comprises polyvinylidene fluoride.

10. A method for manufacturing a slurry for a storage battery electrode comprising the steps of:
    forming an active material;
    forming a mixture of an oxidized derivative of a first conductive additive and the active material;
    measuring a basicity using a part of the mixture; and
    forming the slurry using another part of the mixture and a binder only in the case where the measured basicity is a pH of larger than or equal to 7.

11. The method for manufacturing a slurry for a storage battery electrode according to claim 10,
    wherein the active material is in a form of powder, and wherein an aqueous solution with a pH of greater than or equal to 11.1 and less than or equal to 12.5 is obtained in the case where the active material and water with a pH of 7 are mixed at a weight ratio of 1:10.

12. The method for manufacturing a slurry for a storage battery electrode according to claim 10, wherein in the step of measuring the basicity, the part of the mixture is dried to be powdered, and a hydrogen-ion concentration of an aqueous solution obtained by mixing the powdered mixture and water with a pH of 7 at a ratio of 1:10 is measured.

13. The method for manufacturing a slurry for a storage battery electrode according to claim 12, wherein the measured basicity is within a pH range of greater than or equal to 7.0 and less than 11.1.

14. The method for manufacturing a slurry for a storage battery electrode according to claim 12, wherein the measured basicity is within a pH range of greater than or equal to 10 and less than or equal to 11.

15. The method for manufacturing a slurry for a storage battery electrode according to claim 10, further comprising filtrating the slurry.

16. The method for manufacturing a slurry for a storage battery electrode according to claim 10, further comprising reducing the slurry.

17. The method for manufacturing a slurry for a storage battery electrode according to claim 10, wherein the oxidized derivative is graphene oxide.

18. The method for manufacturing a slurry for a storage battery electrode according to claim 17, wherein the graphene oxide and water with a pH of 7 are mixed at a weight ratio of 1:10 to give an aqueous solution with a pH of greater than or equal to 0.9 and less than or equal to 1.2.

19. The method for manufacturing a slurry for a storage battery electrode according to claim 12, wherein the binder comprises polyvinylidene fluoride.

* * * * *